United States Patent
Horikawa et al.

(10) Patent No.: US 8,339,697 B2
(45) Date of Patent: Dec. 25, 2012

(54) WAVELENGTH CONVERSION LASER LIGHT SOURCE AND IMAGE DISPLAY DEVICE

(75) Inventors: Nobuyuki Horikawa, Kyoto (JP); Hiroyuki Furuya, Osaka (JP); Tetsuro Mizushima, Hyogo (JP); Koichi Kusukame, Osaka (JP); Tomoya Sugita, Nara (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 248 days.

(21) Appl. No.: 12/936,747

(22) PCT Filed: Feb. 25, 2010

(86) PCT No.: PCT/JP2010/001292
§ 371 (c)(1),
(2), (4) Date: Oct. 7, 2010

(87) PCT Pub. No.: WO2010/098115
PCT Pub. Date: Sep. 2, 2010

(65) Prior Publication Data
US 2011/0032598 A1   Feb. 10, 2011

(30) Foreign Application Priority Data
Feb. 26, 2009 (JP) ................. 2009-043356

(51) Int. Cl.
*G02F 2/02* (2006.01)
*H01S 3/10* (2006.01)
(52) U.S. Cl. ............... 359/326; 359/328; 372/22
(58) Field of Classification Search .......... None
See application file for complete search history.

(56) References Cited

U.S. PATENT DOCUMENTS 5,898,718 A * 4/1999 Mohatt et al. .......... 372/22
6,707,838 B2   3/2004 Tani et al.
(Continued)

FOREIGN PATENT DOCUMENTS
CN   1499679   5/2004
(Continued)

OTHER PUBLICATIONS
International Search Report issued Mar. 23, 2010 in International (PCT) Application No. PCT/JP2010/001292.

*Primary Examiner* — Hemang Sanghavi
(74) *Attorney, Agent, or Firm* — Wenderoth, Lind & Ponack, L.L.P.

(57) ABSTRACT

A wavelength conversion laser light source includes a fundamental wave laser light source (1) to generate a fundamental wave; a first mirror and a second mirror (4, 5), arranged so as to oppose each other; a wavelength conversion element (3) which is arranged between the first mirror and the second mirror and converts the wavelength of the fundamental wave; and a temperature control portion (8) to control the temperature of the wavelength conversion element. A portion of the fundamental wave is wavelength-converted in the wavelength conversion element, and moreover the fundamental wave which is not wavelength-converted is reflected by the first mirror and the second mirror and is repeatedly incident on the wavelength conversion element and is wavelength-converted, and the temperature control portion is arranged so as to be in contact with the wavelength conversion element, and the light quantity of the fundamental wave incident on the temperature control portion is reduced by a fundamental wave absorption portion (18).

11 Claims, 13 Drawing Sheets

U.S. PATENT DOCUMENTS

| | | | |
|---|---|---|---|
| 7,999,998 B2 * | 8/2011 | Morikawa et al. | 359/328 |
| 2002/0186743 A1 | 12/2002 | Tani et al. | |
| 2009/0257463 A1 * | 10/2009 | Kusukame et al. | 372/22 |
| 2010/0309438 A1 * | 12/2010 | Mizushima et al. | 353/31 |

FOREIGN PATENT DOCUMENTS

| | | |
|---|---|---|
| CN | 2932767 | 8/2007 |
| JP | 6-138507 | 5/1994 |
| JP | 7-120799 | 5/1995 |
| JP | 11-44897 | 2/1999 |
| JP | 2002-350613 | 12/2002 |
| JP | 2003-121895 | 4/2003 |
| JP | 2004-219911 | 8/2004 |
| JP | 2005-268780 | 9/2005 |
| JP | 2006-208629 | 8/2006 |
| JP | 2008-224932 | 9/2008 |

* cited by examiner

WAVELENGTH CONVERSION LASER LIGHT SOURCE AND IMAGE DISPLAY DEVICE

TECHNICAL FIELD

This invention relates to a wavelength conversion laser light source which converts the wavelength of fundamental laser light, and an image display device using the same.

BACKGROUND ART

Laser light sources widely used in industrial applications and as devices incorporated into consumer equipment include semiconductor laser diodes and solid state laser light sources and similar. Moreover, wavelength conversion laser light sources are light sources used to obtain laser light at wavelengths difficult to obtain from direct oscillation of semiconductor laser diodes and solid state laser light sources.

In a wavelength conversion laser light source, the laser light frequency, that is, the wavelength, is converted through nonlinear optical effects such as SHG (Second Harmonic Generation), in which light at twice the frequency (the second harmonic) of the fundamental wave laser light (hereafter abbreviated to fundamental wave) incident on a wavelength conversion element is generated, and SFG (Sum Frequency Generation), in which light at the frequency which is the sum of two frequencies (sum frequency) of incident light with two frequencies is generated.

FIG. 23 shows an example of a wavelength conversion laser light source, proposed in the prior art, which generates the second harmonic. The wavelength conversion laser light source comprises a fundamental wave laser light source 111 which generates a fundamental wave, a lens 112 to condense and cause incidence on a wavelength conversion element 113 of the fundamental wave emitted from the fundamental wave laser light source 111, the wavelength conversion element 113 which generates the second harmonic of the fundamental wave, and a dichroic mirror 114 which separates the fundamental wave FL (transmissive fundamental wave laser) and the second harmonic SL (wavelength conversion laser); the fundamental wave is condensed and is passed once through the wavelength conversion element 113 to generate the second harmonic.

The wavelength conversion element 113 comprises a nonlinear optical crystal; it is necessary to control the crystal orientation and the period of the poled structure such that the phases of the fundamental wave and the second harmonic coincide. In particular, a quasi-phase-matched wavelength conversion element using a periodically polarization-inverted structure can perform wavelength conversion with high efficiency, and, depending on the design of the poled period, can convert a fundamental wave of arbitrary wavelength into the second harmonic, and so is widely used.

Here, the efficiency η of wavelength conversion from the fundamental wave to the second harmonic is given by equation (1) below, where L is the interaction length in the wavelength conversion element, P is the fundamental wave power, A is the beam cross-sectional area in the wavelength conversion element, and Δk is the phase difference between the fundamental wave and the second harmonic, relative to the phase matching condition.

$$\eta \alpha (L^2 \times P/A) \times \mathrm{sinc}^2(\Delta k \times L) \quad (1)$$

From the above equation (1), it is seen that by lengthening the wavelength conversion element interaction length L, highly efficient wavelength conversion can be performed.

However, if the interaction length L is made long, the conditions for making the phase difference Δk between the fundamental wave and the second harmonic small (for example, the fundamental wave incidence angle and wavelength conversion element temperature conditions) become more strict, so that the drop in wavelength conversion efficiency becomes prominent, and for practical purposes the interaction length L is limited. For example, due to wavelength conversion element temperature conditions, the interaction length L has been limited, and it has been difficult to raise the efficiency. The temperature of the wavelength conversion element when the phase difference Δk between the fundamental wave and the second harmonic is 0 is called the phase-matching temperature, and the wavelength conversion element temperature width at which the wavelength conversion efficiency is half is called the temperature tolerance width.

In the past, there have been numerous proposals to improve the wavelength conversion efficiency of a wavelength conversion laser light source. For example, in Patent Document 1, it is proposed that wavelength conversion efficiency be raised by using a plurality of wavelength conversion elements and optical condensing means. And, in Patent Document 2, it is proposed that fundamental wave reflection means be used to provide a fundamental wave reflecting member for a wavelength conversion element, to cause repeated incidence on the wavelength conversion element. Further, in Patent Document 3, it is proposed that a wavelength conversion element be arranged between opposing concave mirrors, and that wavelength conversion of the fundamental wave traveling back and forth be performed.

However, in each of the above configurations proposed in the prior art, the wavelength conversion efficiency of a wavelength conversion laser light source can be improved, but there has been the problem that the wavelength conversion efficiency fluctuates greatly due to temperature changes of the wavelength conversion element.

Patent Document 1: Japanese Patent Application Laid-open No. H11-44897
Patent Document 2: Japanese Patent Application Laid-open No. 2006-208629
Patent Document 3: Japanese Patent Application Laid-open No. 2005-268780

DISCLOSURE OF THE INVENTION

An object of this invention is to provide a high-output, high-stability wavelength conversion laser light source, the temperature tolerance width of the wavelength conversion element of which can be expanded in a state in which high wavelength conversion efficiency is maintained, and which can suppress fluctuations in the wavelength conversion efficiency of the wavelength conversion element due to unwanted fundamental waves.

The wavelength conversion laser light source according to one aspect of the invention comprises a fundamental wave laser light source to generate a fundamental wave; a first mirror and a second mirror, arranged so as to oppose each other; a wavelength conversion element which is arranged between the first mirror and the second mirror and converts the wavelength of the fundamental wave; and a temperature control portion to control the temperature of the wavelength conversion element; a portion of the fundamental wave is wavelength-converted in the wavelength conversion element, and moreover the fundamental wave which is not wavelength-converted is reflected by the first mirror and the second mirror and is repeatedly incident on the wavelength conversion element and is wavelength-converted, and the temperature control portion is arranged so as to be in contact with the wavelength conversion element, and the light quantity of the fundamental wave incident on the temperature control portion is reduced.

In the above wavelength conversion laser light source, the temperature tolerance width of the wavelength conversion element can be expanded in a state in which a high wavelength conversion efficiency is maintained, and moreover fluctuations in the wavelength conversion efficiency of the wavelength conversion element due to unwanted fundamental waves can be suppressed, so that a high-output, high-stability wavelength conversion laser light source can be realized.

BEST MODE FOR CARRYING OUT THE INVENTION

Figure 1:
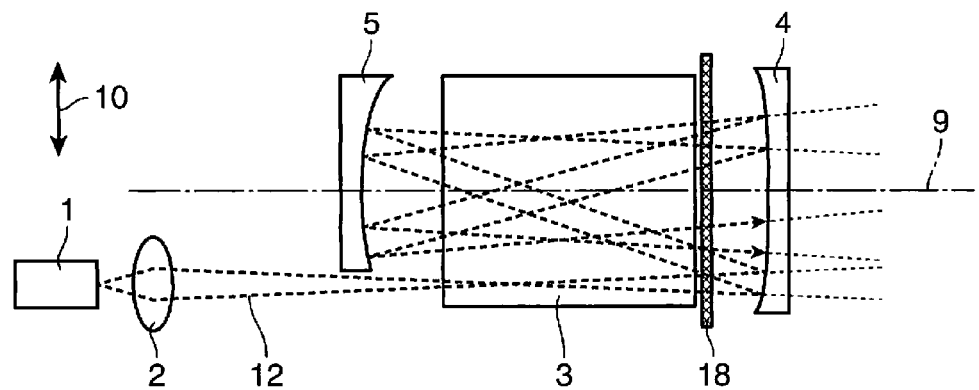
FIG. 1 is a top view of the wavelength conversion laser light source in Embodiment 1 of the invention.

Below, wavelength conversion laser light sources of embodiments of the invention are explained, referring to the drawings. In the drawings, the same symbols denote the same constituent elements, or members which perform a similar action or operation.

(Embodiment 1)

Figure 2:
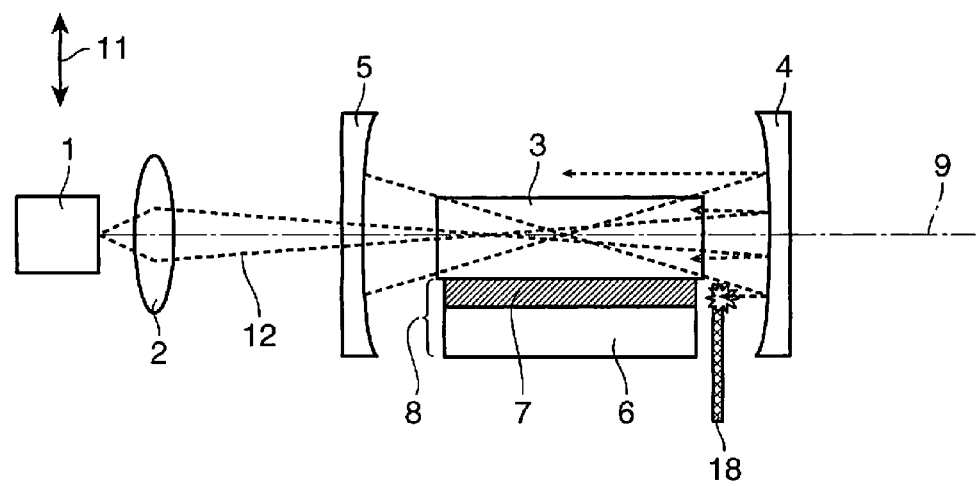
FIG. 2 is a side view of the wavelength conversion laser light source shown in FIG. 1.

FIG. 1 and FIG. 2 show an example of the configuration of the wavelength conversion laser light source of Embodiment 1 of the invention; FIG. 1 is a top view of the wavelength conversion laser light source in this embodiment, and FIG. 2 is a side view of the configuration of the wavelength conversion laser light source shown in FIG. 1. Below, the directions indicated by the arrow 10 in FIG. 1 and by the arrow 11 in FIG. 2 are respectively taken to be the element width direction (the width direction of the wavelength conversion element 3) and the element thickness direction (the thickness direction of the wavelength conversion element 3).

In FIG. 1 and FIG. 2, reference numeral 1 denotes a fundamental wave laser light source to generate a fundamental wave, 2 denotes a condensing optical system to condense the fundamental wave, 3 denotes a wavelength conversion element to cause conversion of the fundamental wave into the second harmonic, 4 denotes a first concave mirror having curvature R1, 5 denotes a second concave mirror having curvature R2 different from curvature R1, 6 denotes a temperature control element to control the temperature of the wavelength conversion element 3, 7 denotes an element immobilizing base to immobilize the wavelength conversion element 3, and 18 denotes a fundamental wave absorption portion serving as a fundamental wave laser blocking portion (an example of a fundamental wave blocking portion).

A temperature control portion 8 comprises the temperature control element 6 and the element immobilizing base 7; the temperature control portion 8 is arranged such that one of the principal faces is in contact with one of the principal faces of the wavelength conversion element 3. The fundamental wave absorption portion 18 is arranged between the first concave mirror 4 and the temperature control portion 8, and prevents absorption in the temperature control portion 8 of the fundamental wave which cannot be incident on the wavelength conversion element 3, and reduces the light quantity of the fundamental wave absorbed in the temperature control portion 8. As shown in FIG. 2, it is preferable that the upper face of the fundamental wave absorption portion 18 be arranged in a position which blocks the fundamental wave reflected by the first concave mirror 4 without blocking the fundamental wave and second harmonic incident from the wavelength conversion element 3 on the first concave mirror 4, for example, at the height of the surface of contact between the wavelength conversion element 3 and the element immobilizing base 7.

Further, 9 shown in FIG. 1 and FIG. 2 denotes a central axis, which is the axis passing through the centers of the first concave mirror 4, second concave mirror 5, and wavelength conversion element 3, and the dashed lines denoted by 12 schematically indicate the paths of fundamental wave laser light and the condensed state in the optical system comprised by the wavelength conversion laser device of this embodiment.

Here, as the fundamental wave laser light source 1, a fiber laser light source is used, and the condensing optical system 2 comprises a collimating lens and a plano-convex lens. As the first concave mirror 4, a concave mirror with a focal length f1=25 mm is used, and as the second concave mirror 5, a concave mirror with a focal length f2=20 mm is used. As the wavelength conversion element 3, $MgO:LiNbO_3$ crystal (PPLN), having a periodically poled structure, is used. The length of the wavelength conversion element 3 (length in the direction of the central axis 9) is 26 mm, the width (length in the direction of the arrow 10) is 10 mm, and the thickness (length in the direction of the arrow 11) is 0.5 mm.

Further, the first concave mirror 4 comprises a coating with a high reflectivity for the fundamental wave and a high transmissivity for the second harmonic, and the second concave mirror 5 comprises a coating with a high reflectivity for both the fundamental wave and for the second harmonic. Further, the first concave mirror 4 and the second concave mirror 5 are arranged such that the concave portions are opposed, and the wavelength conversion element 3 is arranged between the two concave mirrors 4 and 5.

Figure 3:
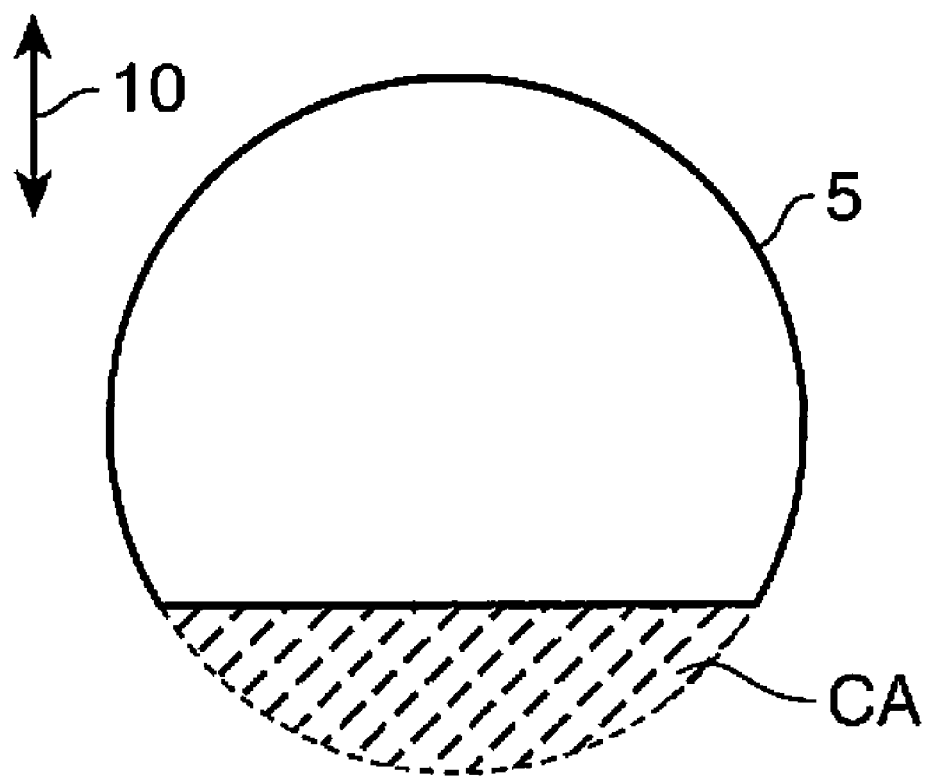
FIG. 3 is a front view seen from the central axis direction of the second concave mirror shown in FIG. 1.

FIG. 3 is a front view of the second concave mirror 5 seen from the direction of the central axis 9. The first concave mirror 4 is circular, but as shown in FIG. 3, the second concave mirror 5 has a cutout area CA, resulting from cutting away the bottom portion (the area indicated by dashed lines in the figure) from a circular concave mirror, in order that a fundamental wave generated by the fundamental wave laser light source 1 is incident on the wavelength conversion element 3. The shape of this cutout area CA is not limited to the above example in particular, and another shape may be used, so long as a fundamental wave generated by the fundamental wave laser light source 1 can be made incident on the wavelength conversion element 3.

The temperature control portion 8 comprises the temperature control element 6 and the element immobilizing base 7, comprising copper with high thermal conductivity; the element immobilizing base 7 and wavelength conversion element 3 are in contact and immobilized by means of adhesive with high heat dissipation and thermal conductivity. In this embodiment, as the temperature control element 6 a Peltier element is used, and a control circuit or similar, not shown, is used to control the temperature control element 6 such that the temperature of the Peltier element, that is, the temperature of the wavelength conversion element 3, is a prescribed temperature.

As the fundamental wave absorption portion 18 serving as the fundamental wave laser blocking portion, for example a colored glass filter which absorbs the fundamental wave is used, and is arranged between the temperature control portion 8 and the first concave mirror 4. As a colored glass filter, for example, when the wavelength of the fundamental wave is 1064 nm, a rectangular absorption filter which absorbs 99% or more of light in the frequency band of 1064±1 nm can be used. The shape of the fundamental wave absorption portion 18 is not limited to the above example in particular, and another shape may be used, so long as the unwanted fundamental wave can be absorbed.

Below, the operation and function of a wavelength conversion laser light source configured as described above are explained. First, the fundamental wave resulting from oscillation of the fundamental wave light source 1 (hereafter also called fundamental wave laser light) is condensed by the condensing optical system 2. In this embodiment, a portion of the second concave mirror 5 is cut away, and a fundamental wave parallel to the central axis 9 is incident on the wavelength conversion element 3 from the cutout area CA, that is, from the area where the second concave mirror 5 is absent.

The two concave mirrors 4 and 5 are arranged at an interval such that there is no confocal arrangement, and moreover by using concave mirrors 4 and 5 with different focal lengths, a structure is possible in which a plurality of optically condensed points are provided within the wavelength conversion element 3, in the space in which the fundamental wave is reflected between the concave mirrors 4 and 5. By arranging the concave mirrors 4 and 5 at an interval such that there is no confocal arrangement, concentration of optically condensed points at one point in the wavelength conversion element 3 can be prevented, and destruction of the wavelength conversion element 3 and local heat generation can be prevented. Further, through this optical arrangement, the fundamental wave is made to travel back and forth between the concave mirrors 4 and 5, to repeatedly pass ten or more times through the wavelength conversion element 3.

Here, the radii of curvature R1, R2 of the two concave mirrors 4 and 5 are set such that R1>R2. That is, the focal lengths f1, f2 of the two concave mirrors 4 and 5 are set such that f1>F2. By this means, in for example FIG. 1, the fundamental wave advancing from the second concave mirror 5 toward the first concave mirror 4 is condensed, and the fundamental wave advancing from the first concave mirror 4 toward the second concave mirror 5 is substantially parallel light.

In this embodiment, the optical path of the fundamental wave propagating from one concave mirror to the other concave mirror is taken to be one optical path, and the path by which the fundamental wave passes through the wavelength conversion element 3 for the nth time is taken to be the nth path. Hence the fundamental wave is condensed by the condensing optical system 2, a portion of the fundamental wave incident on the wavelength conversion element 3 is converted into the second harmonic, and the remaining fundamental wave not wavelength-converted and the wavelength-converted second harmonic both arrive at the first concave mirror 4 (first path).

Next, the fundamental wave which is not wavelength-converted is reflected by the first concave mirror 4, and the second harmonic passes through the first concave mirror 4 and is output to the outside. The fundamental wave reflected by the first concave mirror 4 is again incident on the wavelength conversion element 3, is partially converted into the second harmonic, and reaches the second concave mirror 5 (second path).

Next, the fundamental wave and second harmonic reflected by the second concave mirror 5 are again incident on the wavelength conversion element 3, a portion of the fundamental wave is converted into the second harmonic, and the first concave mirror 4 is reached (third path).

In this way, a structure is employed in which, while traveling back and forth between the two concave mirrors 4 and 5, the fundamental wave repeatedly passes through the wavelength conversion element 3, causing generation of the second harmonic. A coating which raises transmissivity for the second harmonic is applied to the first concave mirror 4, and the generated second harmonic is output to the outside from the side of the first concave mirror 4. At this time, the temperature of the wavelength conversion element 3 is controlled by the temperature control portion 8 such that the second harmonic output is maximum.

By means of the above configuration, the wavelength conversion efficiency can be improved compared with a wavelength conversion laser light source of the prior art, in which light passes through the wavelength conversion element 3 only once.

Further, it is desirable that control be performed so as to condense the fundamental wave within the wavelength conversion element 3 while on paths from the second concave mirror 5 toward the first concave mirror 4 (while on odd-numbered paths). While traveling from the first concave mirror 4 toward the second concave mirror 5 (while on even-numbered paths), the fundamental wave is substantially parallel light, and wavelength conversion from the fundamental wave to the second harmonic is negligible compared with on odd-numbered paths. By means of the above configuration, compared with a wavelength conversion laser light source of the prior art in which light passes through the wavelength conversion element 3 only once, the efficiency of wavelength conversion from the fundamental wave to the second harmonic can be doubled.

Further, in the wavelength conversion laser light source of this embodiment, the angle of incidence of the fundamental wave on the wavelength conversion element 3 changes with each path therethrough, and the phase-matching conditions to be satisfied, such as the fundamental wave wavelength, the refractive index (temperature) of the nonlinear optical material (wavelength conversion element 3) and similar, differ according to the angle of incidence of the fundamental wave for each path. That is, upon wavelength conversion of a fundamental wave with a certain wavelength, the temperature of the wavelength conversion element 3 satisfying the phase-matching conditions differs for each path, so that even when the temperature of the wavelength conversion element 3 deviates from the temperature satisfying the phase-matching conditions for a certain path, there is coincidence with the phase-matching conditions for another path, and so there is the advantageous result that declines in the wavelength conversion efficiency are suppressed.

Figure 23:
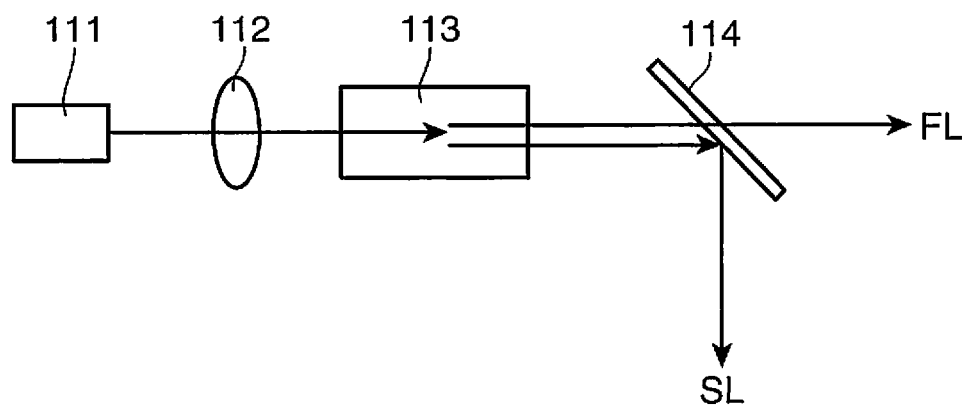
FIG. 23 is a schematic diagram of a wavelength conversion laser light source of the prior art.

For example, in the case of the configuration of the prior art shown in FIG. 23, the temperature tolerance width (half-maximum width) was approximately 1.1° C., but the temperature tolerance width (half-maximum width) for this embodiment was 2.6° C., and so a temperature tolerance width of more than twice that for the configuration of the prior art was achieved.

Figure 4:
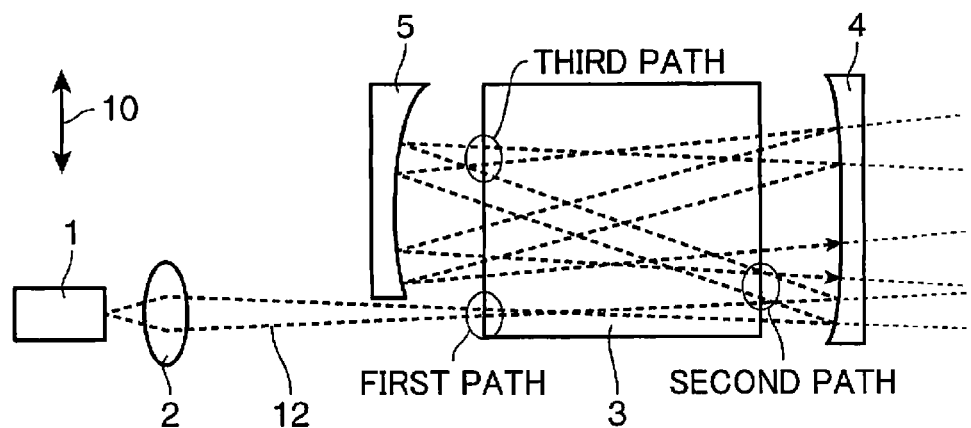
FIG. 4 is an explanatory diagram showing the positions of incidence on the wavelength conversion element of the fundamental wave on each path, when the focal length f1 of the first concave mirror is set to 25 mm and the focal length f2 of the second concave mirror is set to 20 mm.
Figure 5:
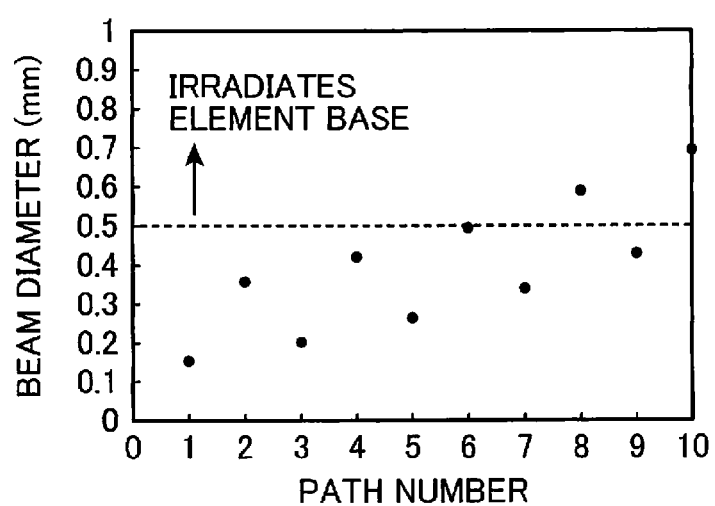
FIG. 5 shows the beam diameters of the fundamental wave at positions of incidence of the fundamental wave on the wavelength conversion element on each of the paths shown in FIG. 4.

Further, the beam diameter of the fundamental wave incident on the wavelength conversion element 3 expands while traveling back and forth between the two concave mirrors 4 and 5. FIG. 4 is an explanatory diagram showing the positions of incidence on the wavelength conversion element 3 of the fundamental wave on each path, when the focal length f1 of the first concave mirror 4 is set to 25 mm and the focal length f2 of the second concave mirror 5 is set to 20 mm. FIG. 5 shows the beam diameters of the fundamental wave at positions of incidence of the fundamental wave on the wavelength conversion element 3 (for example, positions shown in FIG. 4) on each of the paths.

Figure 6:
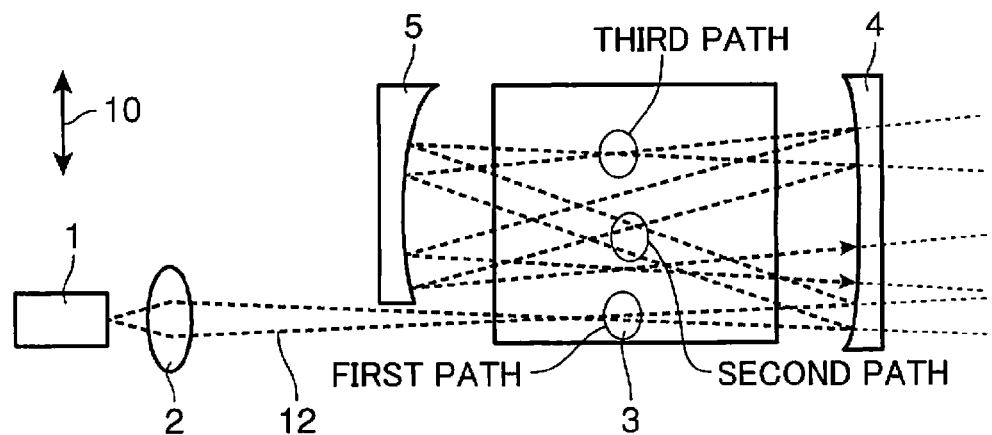
FIG. 6 is an explanatory diagram showing the positions of the fundamental wave on each path at the center positions in the wavelength conversion element 3, when the focal length f1 of the first concave mirror 4 is set to 25 mm and the focal length f2 of the second concave mirror 5 is set to 20 mm.
Figure 7:
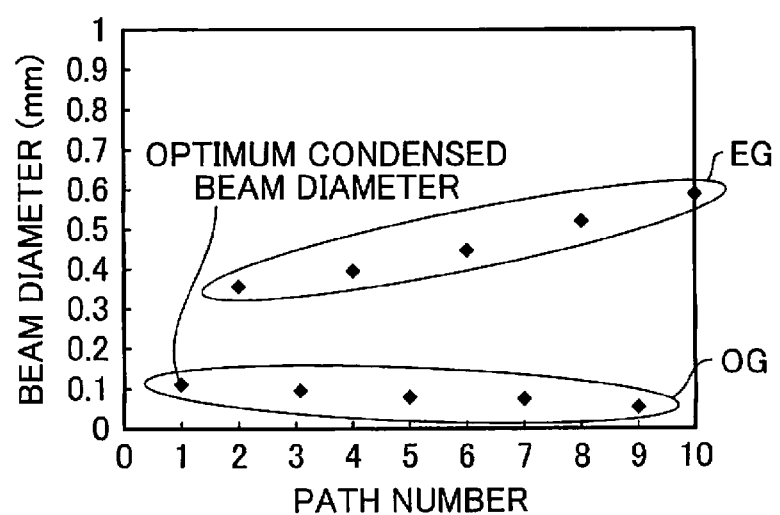
FIG. 7 shows the beam diameters of the fundamental wave at the center positions of the wavelength conversion element on each of the paths shown in FIG. 6.

Further, FIG. 6 is an explanatory diagram showing the positions of the fundamental wave on each path at the center positions in the wavelength conversion element 3, when the focal length f1 of the first concave mirror 4 is set to 25 mm and the focal length f2 of the second concave mirror 5 is set to 20 mm, and FIG. 7 shows the beam diameters of the fundamental wave at the center positions of the wavelength conversion element 3 (for example, positions shown in FIG. 6) on each of the paths. The horizontal axes in FIG. 5 and FIG. 7 indicate the path number, and the vertical axes indicate the beam diameter (mm) of the fundamental wave.

From FIG. 5, the beam diameter of the fundamental wave exceeds the 0.5 mm thickness of the wavelength conversion element 3 (shown above the dashed line in FIG. 5) while traveling back and forth between the concave mirrors 4 and 5, and a portion of the fundamental wave is seen to not be incident on the wavelength conversion element 3. Further, as shown in FIG. 7, a condensing optical system 2 is selected such that the fundamental wave beam diameter becomes the optimum condensed beam diameter on the first path. As explained above, it is seen that on paths of the odd-numbered group OG, there are optically condensed points within the wavelength conversion element 3; on the other hand, on paths of the even-numbered group EG, there are no optically condensed points.

Because the fundamental wave beam diameter changes as described above, in this embodiment it is desirable that a fundamental wave absorption portion 18 be arranged at least between the first concave mirror 4 and the temperature control portion 8. The reason for this is explained below.

That is, on even-numbered paths on which the fundamental wave is reflected by the first concave minor 4 and is incident on the wavelength conversion element 3, the fundamental wave beam diameter exceeds the thickness of the wavelength conversion element 3 (for example, the eighth path in FIG. 5), so that the fundamental wave irradiates the element immobilizing base 7 and the absorbed light quantity increases; on the other hand, on odd-numbered paths on which the fundamental wave is reflected by the second concave mirror 5 and is incident on the wavelength conversion element 3, the beam diameter at the position of incidence on the wavelength conversion element 3 is small compared with even-numbered paths, and the fundamental wave light quantity which irradiates the element immobilizing base 7 and is absorbed is small.

Here, the temperature change of the element immobilizing base 7 depends on the fundamental wave light quantity which irradiates and is absorbed, and so by providing the fundamental wave absorption portion 18 between the first concave mirror 4 and the temperature control portion 8, changes in the temperature of the element immobilizing base 7 can be effectively suppressed, and as a result the second harmonic output light source is made stable.

Thus in this embodiment, by arranging a fundamental wave absorption portion 18 between the temperature control element 6 and the first concave mirror 4, the fundamental wave absorption portion 18 absorbs the unwanted fundamental wave which is not wavelength-converted, and so there is action to prevent absorption of the fundamental wave by the temperature control portion 8. Through this action, rises in the temperature of the wavelength conversion element 3 by the fundamental wave which is not wavelength-converted are impeded, and declines in the second harmonic output can be decreased. Of course, a fundamental wave absorption portion may also be provided between the second concave mirror 5 and the temperature control portion 8, and in this case, a light source with a still more stable output can be provided.

Figure 8:
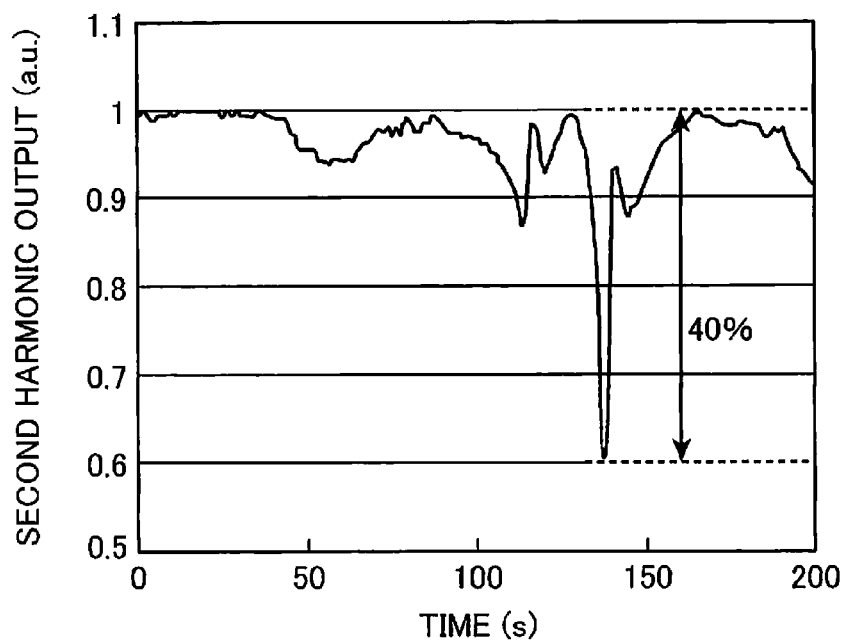
FIG. 8 shows the change with time in the second harmonic output, when a configuration is used with a fundamental wave absorption portion omitted, the wavelength conversion laser light source is operated under constant-current control, and adjustment is performed such that the second harmonic output is approximately 6 W.
Figure 9:
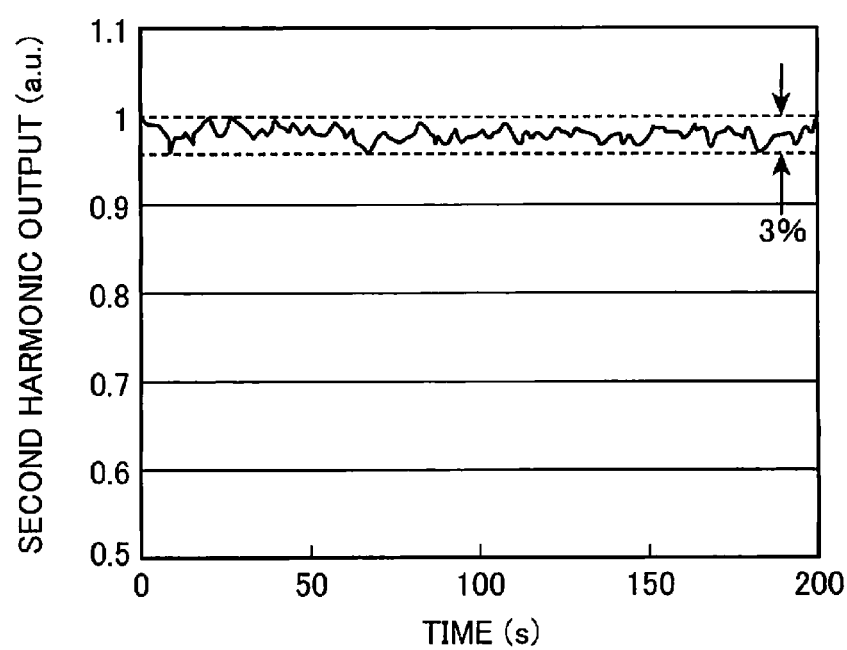
FIG. 9 shows the change with time in the second harmonic output, when the configuration of Embodiment 1 is used, the wavelength conversion laser light source is operated under constant-current control, and adjustment is performed such that the second harmonic output is approximately 6 W.

Advantageous results obtained from the above configuration are explained in detail using FIG. 8 and FIG. 9. FIG. 8 shows the change with time in the second harmonic output, when a configuration is used with a fundamental wave absorption portion 18 omitted (for example, the configuration shown in FIG. 4), the wavelength conversion laser light source is operated under constant-current control, and adjustment is performed such that the second harmonic output is approximately 6 W. FIG. 9 shows the change with time in the second harmonic output, when the configuration of this embodiment is used, the wavelength conversion laser light source is operated under constant-current control, and adjustment is performed such that the second harmonic output is approximately 6 W. The horizontal axes in FIG. 8 and FIG. 9 indicate time (s), and the vertical axes indicate normalized values of the second harmonic output.

In each of the above examples, the temperature of the wavelength conversion element 3 is controlled by the temperature control portion 8; but as shown in FIG. 8, if a configuration without a fundamental wave absorption portion 18 is used to perform continuous operation for 3 minutes or longer at a second harmonic output of 6 W, the temperature control portion 8 cannot adequately control the temperature of the wavelength control element 3, the temperature control portion 8 absorbs the unwanted fundamental wave and the temperature of the wavelength conversion element 3 rises, and the second harmonic output fluctuates by a maximum of 40%. On the other hand, as shown in FIG. 9, by using the configuration of this embodiment the unwanted fundamental wave was absorbed by the fundamental wave absorption portion 18, and a rise in the temperature of the wavelength conversion element 3 due to the unwanted fundamental wave could be impeded, so that fluctuation in the second harmonic output could be suppressed to 3% or less, and a high-output, high-stability wavelength conversion laser light source could be obtained.

Figure 10:
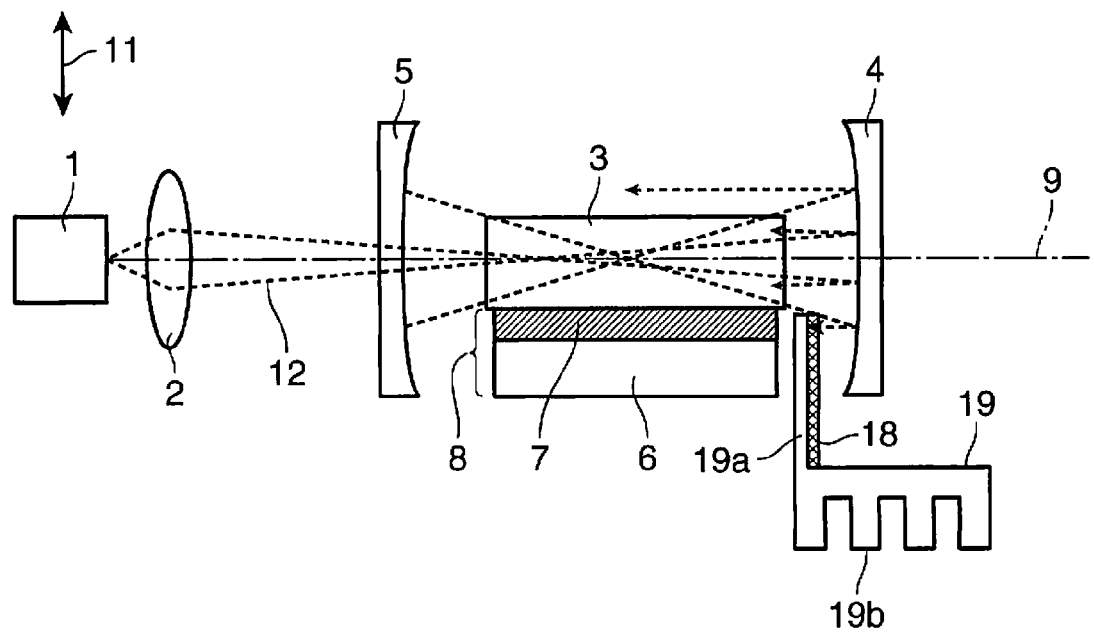
FIG. 10 shows an example in which a heat-dissipating mechanism is added to the wavelength conversion laser light source shown in FIG. 1.

Further, the fundamental wave absorption portion 18 may comprise a heat-dissipating mechanism which dissipates heat to the outside, without transmitting heat due to the absorbed fundamental wave to the temperature control portion 8. FIG. 10 shows an example in which a heat-dissipating mechanism 19 is added to the wavelength conversion laser light source shown in FIG. 1. As shown in FIG. 10, the fundamental wave absorption portion 18 is immobilized on the heat-dissipating mechanism 19 by an adhesive with high heat dissipation and thermal conductivity, and the heat-dissipating mechanism 19 comprises an immobilizing portion 19a joined to the fundamental wave absorption portion 18 and a plurality of fins 19b which dissipate heat transmitted from the immobilizing portion 19a to the outside; the immobilizing portion 19a and the plurality of fins 19b are formed integrally.

As the heat-dissipating mechanism 19, metal with high thermal conductivity can be used; for example, copper, silver, aluminum, or similar can be used. Further, grease may be used to cause the fundamental wave absorption portion 18 to make contact with the heat-dissipating mechanism 19. By using grease, the heat-dissipating characteristics and thermal conductivity can be improved. The heat-dissipating mechanism 19 is not limited to the above-described examples in particular, and heat-dissipating mechanisms with various shapes and structures can be used, so long as heat absorbed by the fundamental wave absorption portion 18 can be dissipated to the outside without being transmitted to the temperature control portion 8; for example, a flat metal plate with high thermal conductivity may be used.

By means of the above mechanisms, heat due to absorption of the fundamental wave by the fundamental wave absorption portion 18 is transmitted to the immobilizing portion 19a of the heat-dissipating mechanism 19, and is further transmitted to the plurality of fins 19b. As a result, heat due to absorption of the fundamental wave is dissipated to the outside efficiently without being transmitted to the temperature control portion 8.

Further, in this embodiment, the fundamental wave absorption portion 18 (or heat-dissipating mechanism 19) and the temperature control portion 8 are separated by a prescribed distance, and by enclosing an adiabatic material or similar, the fundamental wave absorption portion 18 and the temperature control portion 8 are thermally separated, and the thermal resistance between the fundamental wave absorption portion 18 and the temperature control portion 8 is increased. As a result, the rise in temperature due to absorption of the fundamental wave by the fundamental wave absorption portion 18 is decreased, changes in the temperature of the wavelength conversion element 3 due to heat generated from the fundamental wave absorption portion 18 are prevented, and moreover a light source with stable output can be provided.

As the fundamental wave laser light source 1 of this Embodiment 1, a fiber laser light source is used. By using a fiber laser light source, a fundamental wave with high beam quality (transverse modes) can be obtained. A fundamental wave with high beam quality can raise the wavelength conversion efficiency when passing through a wavelength conversion element 3 one time. In this way, by raising the wavelength conversion efficiency for each path, the total wavelength conversion efficiency upon passing through the wavelength conversion element 3 a plurality of times can be improved.

As the fundamental wave laser light source 1, in addition to a fiber laser light source, a semiconductor laser light source, solid state laser light source, or various other types of laser light sources may be used. By using a semiconductor laser light source or a solid state laser light source, the fundamental wave laser light source can be made small, and the overall wavelength conversion laser can be made small.

Further, as the condensing optical system 2, a collimating lens and a plano-convex lens are used; but at least one of various types of components, such as collimating lenses, plano-convex lenses, convex lenses, plano-concave lenses, concave lenses, aspherical lenses, and similar may be used to cause condensing within the wavelength conversion element 3. By combining various types of lenses, focal lengths can be shortened, and the wavelength conversion laser light source can be made small.

Further, in this embodiment the fundamental wave beam diameter is adjusted by the condensing optical system 2 to the optimum condensed beam diameter such that the second harmonic output is increased from the first path; but the fundamental wave beam diameter may be made equal to the optimum condensed beam diameter from the third path onward. In this case, expansion of the fundamental wave beam diameter can be suppressed, the amount of heat absorbed by the fundamental wave absorption portion 18 can be reduced, and a more simple mechanism can be used as the heat-dissipating mechanism comprised by the fundamental wave absorption portion 18.

Further, in this embodiment the fundamental wave is made incident on the wavelength conversion element 3 so as to be parallel to the central axis 9 from the area in which there is no second concave mirror 5 (in this embodiment, resulting from cutting away a portion of the second concave mirror 5), but the area of a portion of the second concave mirror 5 may comprise a coating that does not reflect the fundamental wave, without cutting away a portion of the second concave mirror 5. By causing the area of a portion of the second concave mirror 5 to comprise a coating that does not reflect the fundamental wave, the process of cutting away a portion of the second concave mirror 5 can be eliminated, and processes can be simplified.

Further, in this embodiment PPLN of thickness 0.5 mm is used as the wavelength conversion element 3, but PPLN of thickness greater than 0.9 mm may be used. In this case, the amount of heat absorbed by the fundamental wave absorption portion 18 can be reduced to 50% or less, and the heat-dissipating mechanism comprised by the fundamental wave absorption portion 18 can be a simpler mechanism. Further, by making the wavelength conversion element 3 thicker, the fundamental wave component which can be incident on the wavelength conversion element 3 is increased, and the wavelength conversion efficiency is improved, so that low-power driving is made possible.

Further, in this embodiment PPLN of length 26 mm is used as the wavelength conversion element 3, but PPLN shorter than 26 mm may be used. By shortening the length of the wavelength conversion element 3, the temperature tolerance width can be expanded.

Further, PPLN is used in the wavelength conversion element 3, but various types of nonlinear optical materials may be used. For example, lithium triborate crystal ($LiB_3O_5$: LBO), potassium titanyl phosphate ($KTiOPO_4$: KTP) crystal, or $LiTaO_3$ crystal (PPLT) having a periodically pole structure, are used. PPLN and PPLT can satisfy phase-matching conditions at an arbitrary fundamental wave wavelength by changing the period of the periodically poled structure. Hence a wavelength conversion laser light source with an arbitrary second harmonic wavelength can be realized.

Further, because PPLN has a high second-order nonlinear constant, high wavelength conversion efficiency can be obtained even when the fundamental wave input is 20 W or lower, so that low-power driving is possible. PPLT has a low fundamental wave optical absorbance and low second harmonic optical absorbance, and upon fundamental wave input at 20 W or higher, a still more stabilized output can be obtained. LBO has excellent high-output durability, and so in a wavelength conversion laser light source in which fundamental wave pulses with a peak power of 100 W or higher are input, high wavelength conversion efficiency can be obtained, and a wavelength conversion laser light source with high peak output can be provided.

Further, in this embodiment a Peltier element is used as the temperature control element 6, but a heater may be used instead of a Peltier element. When a heater is used, the time to raise the temperature of the wavelength conversion element 3 from the low-temperature side to the phase-matching temperature can be shortened by rapid heating, so that the startup time for the wavelength conversion laser light source can be shortened.

Further, copper with high thermal conductivity, is used in the element immobilizing base 7, but silver, aluminum, or similar may also be used. By using silver, with even higher thermal conductivity than copper, in the element immobilizing base 7, the temperature control properties of the wavelength conversion element 3 can be improved, and second harmonic output can be obtained with still greater stability.

Further, copper with high thermal conductivity may be arranged at the upper portion of the wavelength conversion element 3 also. By arranging metal with high thermal conductivity at the upper portion also, the temperature of the wavelength conversion element 3 can be rendered more uniform, higher wavelength conversion efficiency can be obtained, and low-power driving is made possible. In this case, by using the copper with high thermal conductivity arranged at the upper portion as an element immobilizing base, and bonding a temperature control element to this element immobilizing base, a temperature control portion can be provided on the upper portion of the wavelength conversion element 3 also, to control the temperature of the wavelength conversion element. Further, a fundamental wave absorption portion may also be arranged between this temperature control portion and the first concave mirror 4.

Further, the element immobilizing base 7 and the wavelength conversion element 3 are immobilized and brought into contact by an adhesive with high heat dissipation and thermal conductivity, but grease may also be used to cause contact. By using grease, the heat dissipation and thermal conductivity can be further improved, and second harmonic output can be obtained with still greater stability.

Further, the fundamental wave absorption portion 18 may enclose an adiabatic material and be integrated with the temperature control portion 8. In this case, adjustment of the position of the fundamental wave absorption portion 18 can be simplified, and the cost incurred in adjustment of the position of the fundamental wave absorption portion 18 can be reduced.

Figure 11:
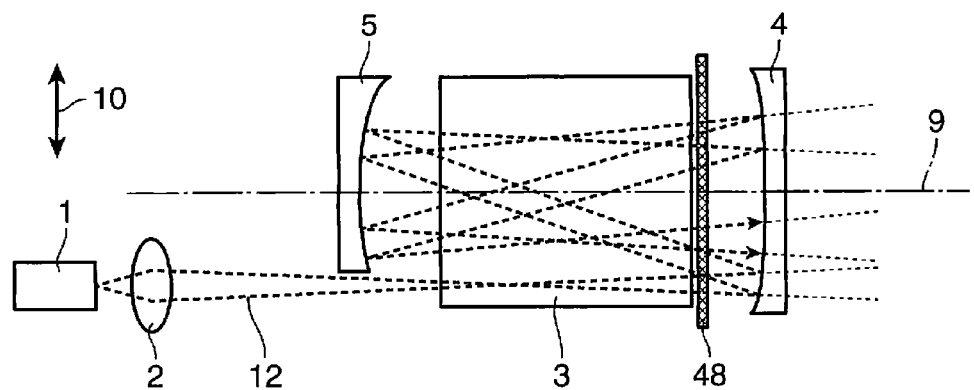
FIG. 11 is a top view of a wavelength conversion laser light source, using an aperture instead of the fundamental wave absorption portion in the wavelength conversion laser light source shown in FIG. 1.

Further, a colored glass filter which absorbs the fundamental wave is arranged between the temperature control portion 8 and the first concave mirror 4 as the fundamental wave absorption portion 18, but an aperture which blocks or absorbs the fundamental wave may be arranged therebetween. FIG. 11 is a diagram, seen from above, of a wavelength conversion laser light source using an aperture instead of the fundamental wave absorption portion of the wavelength conversion laser light source shown in FIG. 1, and FIG. 12 is a diagram seen from the side of the wavelength conversion laser light source shown in FIG. 11.

Figure 12:
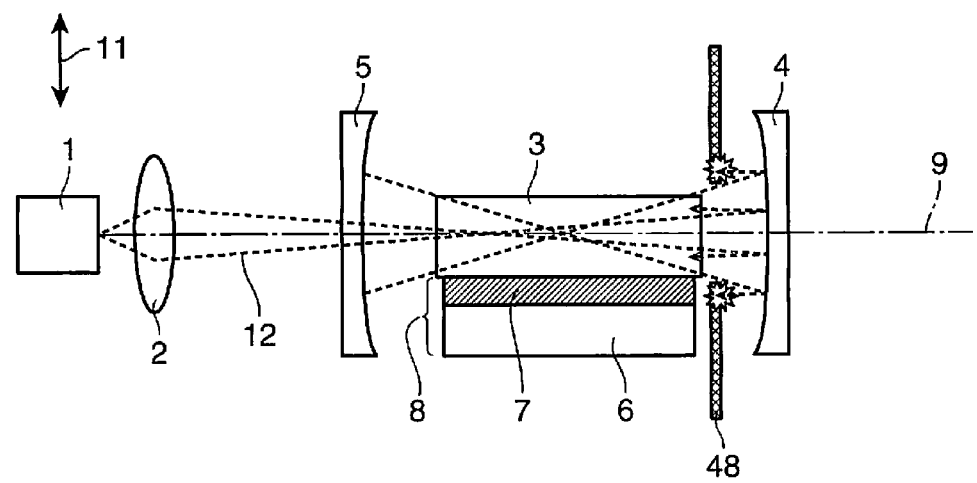
FIG. 12 is a side view of the wavelength conversion laser light source shown in FIG. 11.

As shown in FIG. 11 and FIG. 12, the aperture 48 is an aperture in which a rectangular opening portion is provided in the inside center portion of a rectangular substrate; the shape of the opening portion corresponds to the shape of the end face of the wavelength conversion element 3 on the side of the first concave mirror 4, and the size of the opening portion is for example set to be equal to or smaller than that of the end face of the wavelength conversion element 3 on the side of the first concave mirror 4. The aperture 48 is arranged between the first concave mirror 4 and the temperature control portion 8, and passes the fundamental wave from the opening portion thereof to cause incidence on the wavelength conversion element 3, but blocks the fundamental wave which cannot be incident on the wavelength conversion element 3, so that the fundamental wave which cannot be incident on the wavelength conversion element 3 can be prevented from being absorbed by the temperature control portion 8, and the fundamental wave light quantity absorbed by the temperature control portion 8 is reduced. Further, even when the fundamental wave reflection angles deviate from the design angles due to shifts in the positions of the two concave mirrors 4 and 5, the fundamental wave which is not incident on the wavelength conversion element 3 can be blocked by the aperture 48. Consequently fundamental wave absorption by the temperature control portion 8 can be prevented, and the second harmonic output intensity can be stabilized.

The shape of the aperture is not limited to the above example in particular, and so long as the fundamental wave which cannot be incident on the wavelength conversion element 3 is prevented from being absorbed by the temperature control portion 8, an aperture in which a rectangular opening portion is provided in a circular substrate may be used, or two apertures, upper and lower, may be arranged so as to provide an opening therebetween.

Further, instead of a fundamental wave absorption portion 18, a mirror which reflects the fundamental wave (hereafter also called a fundamental wave-reflecting mirror) may be arranged. By providing a fundamental wave-reflecting mirror, the fundamental wave which cannot be incident on the wavelength conversion element 3 can be prevented from being incident on the temperature control portion 8. Because no fundamental wave absorption occurs in the fundamental wave-reflecting mirror, no heat generation occurs. Hence a heat-dissipating mechanism can be omitted, and the cost of a heat-dissipating mechanism can be eliminated.

Further, by arranging a fundamental wave-reflecting mirror inclined with respect to the fundamental wave optical axis in the thickness direction of the wavelength conversion element 3, a fundamental wave which is once reflected by the fundamental wave-reflecting mirror can be caused to be emitted from between the two concave mirrors 4 and 5 to the outside, without being reflected by the first concave mirror 4 and second concave mirror 5. By causing the fundamental wave to be reflected outside the concave mirror pair, absorption by the temperature control portion 8 of the fundamental wave which is not incident on the wavelength conversion element 3 can be impeded, and the advantageous result of reduced fluctuation of the second harmonic output can be obtained.

Figure 13:
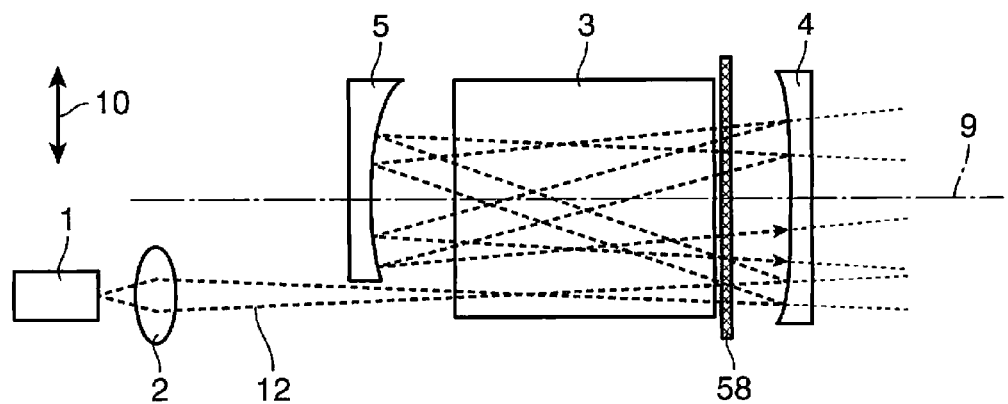
FIG. 13 is a top view of a wavelength conversion laser light source, using a fundamental wave reflecting mirror instead of the fundamental wave absorption portion in the wavelength conversion laser light source shown in FIG. 1.
Figure 14:
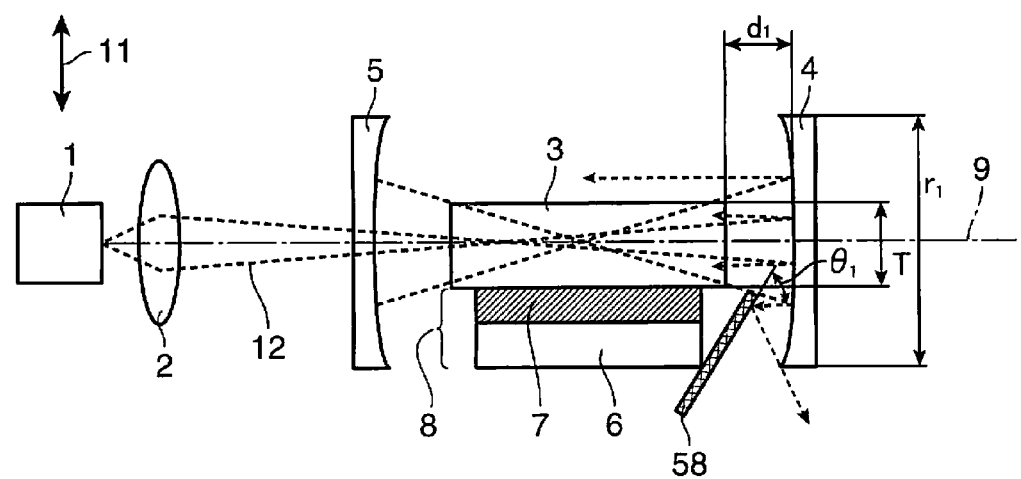
FIG. 14 is a side view of the wavelength conversion laser light source shown in FIG. 13.

FIG. 13 is a diagram, seen from above, of the configuration of a wavelength conversion laser light source using a fundamental wave-reflecting mirror instead of the fundamental wave absorption portion in the wavelength conversion laser light source shown in FIG. 1, and FIG. 14 is a diagram, seen from the side, of the configuration of the wavelength conversion laser light source shown in FIG. 13.

As shown in FIG. 13 and FIG. 14, the fundamental wave-reflecting mirror 58 is arranged between the first concave mirror 4 and the temperature control portion 8 so as to be neither perpendicular to, nor parallel to, the fundamental wave optical path, but so as to be inclined with respect to the fundamental wave optical axis in the thickness direction of the wavelength conversion element 3; the fundamental wave which cannot be incident on the wavelength conversion element 3 is prevented from being absorbed by the temperature control portion 8, and the fundamental wave light quantity absorbed by the temperature control portion 8 is reduced.

Here, if the thickness of the wavelength conversion element 3 is T, the diameter (length in the element thickness direction) of the first concave mirror 4 is $r_1$, and the distance between the end face of the wavelength conversion element 3 on the side of the first concave mirror 4 and the first concave mirror 4 is $d_1$, then it is desirable that the angle $\theta_1$ made by the optical axis of the fundamental wave incident on the fundamental wave-reflecting mirror 58 and the reflecting face of the fundamental wave-reflecting mirror 58 satisfy $(r_1-T)/2 > d_1 \times \tan(\pi - 2\theta_1)$.

By satisfying the above condition, the fundamental wave reflected by the fundamental wave-reflecting mirror 58 is emitted to the outside, without being reflected again by the first concave mirror 4. The emitted fundamental wave is absorbed and/or diffused by for example a colored glass filter, beam diffuser, or similar, and so the effect on the temperature of the wavelength conversion element 3 can be eliminated.

Further, in this embodiment the fundamental wave is condensed within the wavelength conversion element 3 while on odd-numbered paths; but the fundamental wave may be condensed within the wavelength conversion element 3 while on even-numbered paths. Compared with odd-numbered paths, on even-numbered paths the angle of incidence of the fundamental wave on the wavelength conversion element 3 differs greatly for each path, so that the temperature of the phase conversion element 3 satisfying the phase-matching condition is different for each path, and the temperature tolerance width can be further expanded, so that a wavelength conversion laser from which still more stable output is obtained can be provided.

Here, when the fundamental wave is reflected by the second concave mirror 5 and is incident on the wavelength conversion element 3 on an odd-numbered path, the fundamental wave beam diameter exceeds the thickness of the wavelength conversion element 3, and the quantity of the fundamental wave which irradiates the element immobilizing base 7 and is absorbed increases. Consequently, by arranging for example a fundamental wave absorption portion 18 or an aperture 48 between the second concave mirror 5 and the temperature control portion 8 as a fundamental wave laser blocking portion, changes in temperature of the element immobilizing base 7 can be effectively suppressed, so that the second harmonic output of the light source is made stable. Further, in this case also, a fundamental wave absorption portion may be arranged between the first concave mirror 4 and the temperature control portion 8.

Further, as a fundamental wave laser blocking portion, for example a fundamental wave-reflecting mirror 58 may be arranged between the second concave mirror 5 and the temperature control portion 8. Here, if the thickness of the wavelength conversion element 3 is T, the diameter (length in the element thickness direction) of the second concave mirror 5 is $r_2$, and the distance between the end face of the wavelength conversion element 3 on the side of the second concave mirror 5 and the second concave mirror 5 is $d_2$, then it is desirable that the angle $\theta_2$ made by the optical axis of the fundamental wave incident on the fundamental wave-reflecting mirror 58 and the reflecting face of the fundamental wave-reflecting mirror 58 satisfy $(r_2-T)/2 > d_2 \times \tan(\pi - 2\theta_2)$.

By satisfying the above condition, the fundamental wave reflected by the fundamental wave-reflecting mirror 58 is emitted to the outside, without being reflected again by the second concave mirror 5. The emitted fundamental wave is absorbed and/or diffused by for example a colored glass filter, beam diffuser, or similar, and so the effect on the temperature of the wavelength conversion element 3 can be eliminated.

(Embodiment 2)

Figure 15:
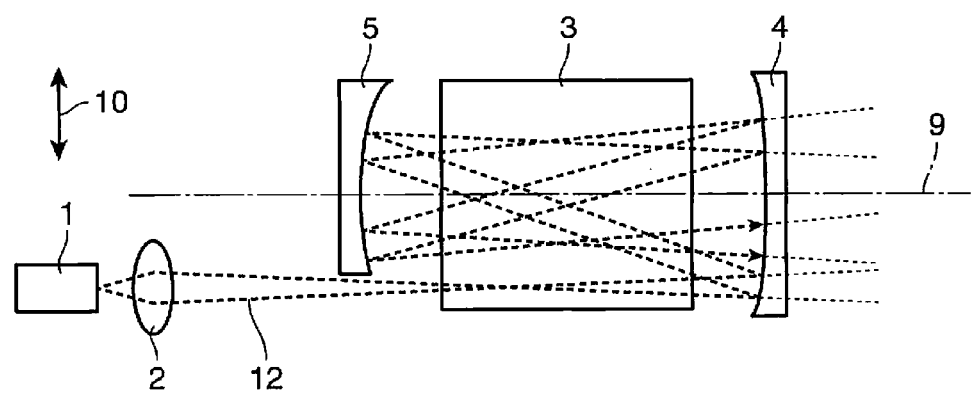
FIG. 15 is a top view of the wavelength conversion laser light source in Embodiment 2 of the invention.
Figure 16:
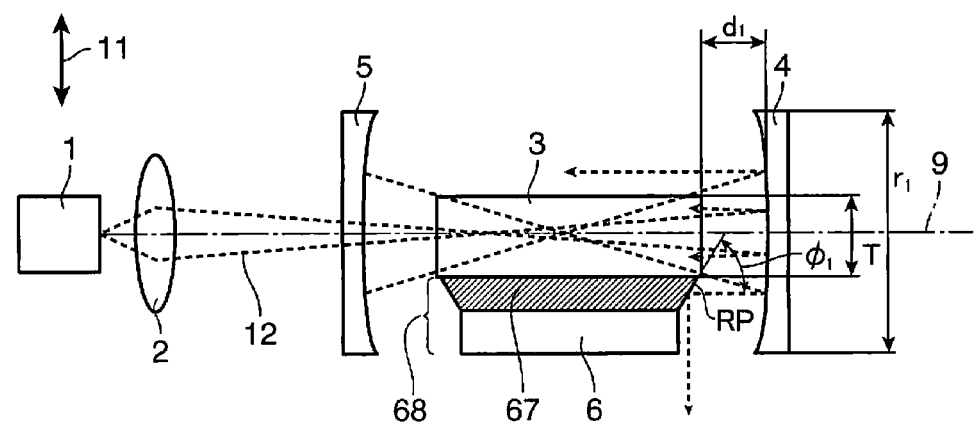
FIG. 16 is a side view of the wavelength conversion laser light source shown in FIG. 15.

FIG. 15 and FIG. 16 show an example of the configuration of the wavelength conversion laser light source of Embodiment 2 of the invention; FIG. 15 is diagram seen from above of the configuration of the wavelength conversion laser light source of this embodiment, and FIG. 16 is a diagram seen from the side of the configuration of the wavelength conversion laser light source shown in FIG. 15. Below, the directions indicated by the arrow 10 in FIG. 15 and by the arrow 11 in FIG. 16 are respectively taken to be the element width direction and the element thickness direction.

In FIG. 15 and FIG. 16, reference numeral 1 denotes a fundamental wave laser light source to generate a fundamental wave, 2 denotes a condensing optical system to condense the fundamental wave, 3 denotes a wavelength conversion element to cause conversion of the fundamental wave into the second harmonic, 4 denotes a first concave mirror having curvature R1, 5 denotes a second concave mirror having curvature R2 different from curvature R1, 6 denotes a temperature control element to control the temperature of the wavelength conversion element 3, and 67 denotes an element immobilizing base to immobilize the wavelength conversion element 3; the temperature control element 6 and element immobilizing base 67 form a temperature control portion 68.

Further, 9 shown in FIG. 15 and FIG. 16 denotes a central axis, which is an axis passing through the centers of the first concave mirror 4, second concave mirror 5, and wavelength conversion element 3; the dashed lines denoted by 12 schematically indicate the paths of fundamental wave laser light and the condensed state in the optical system comprised by the wavelength conversion laser device of this embodiment.

A difference of the wavelength conversion laser light source of this embodiment from the wavelength conversion laser light source described in Embodiment 1 is the omission of the fundamental wave absorption portion 18, instead making an end face of the element immobilizing base 67 a reflecting end face RP, so that fundamental wave laser light is caused to be directed in a desired direction (for example, outside the wavelength conversion laser light source) by the shape of the element immobilizing base 67. As a result, the light quantity of fundamental wave laser light irradiating and absorbed by the element immobilizing base 67 is reduced, and rises in the temperature of the wavelength conversion element 3 can be prevented, so that the wavelength conversion laser output can be stabilized.

Below, the operation and function of this embodiment which differ from those of Embodiment 1 are explained. In a wavelength conversion laser light source of this embodiment, an end face of the element immobilizing base 67 to render uniform the temperature of the wavelength conversion element 3 is machined to an angle which is not perpendicular to the angle of incidence of the fundamental wave, to form the reflecting end face RP, as shown in FIG. 16.

Specifically, if the thickness of the wavelength conversion element 3 is T, the diameter (length in the element thickness direction) of the first concave mirror 4 is $r_1$, and the distance between the first concave mirror 4 and the end face of the wavelength conversion element 3 on the side of the first concave mirror 4 is $d_1$, then the angle $\phi_1$ made by the optical axis of the fundamental wave incident on the reflecting end face RP of the element immobilizing base 67 and the reflecting end face RP of the element immobilizing base 67 satisfies $(r_1-T)/2 > d_1 \times \tan(\pi-2\phi_1)$.

By satisfying the above condition, light reflected by the reflecting end face RP of the element immobilizing base 67 is emitted from between the concave mirror pair reflecting the fundamental wave (the first concave mirror 4 and the second concave mirror 5) to the outside, without being again reflected by the first concave mirror 4. By means of this configuration, repeated reflection of fundamental wave laser light between the element immobilizing base 67 and the concave mirror pair is prevented, so that there is the advantageous result that the fundamental wave laser light quantity absorbed by the element immobilizing base 67 can be reduced.

Further, by using metal material which satisfactorily reflects light at the fundamental wave wavelength as the element immobilizing base 67, a highly reflective surface for the fundamental wave laser light can be obtained. In this case, there is no need to provide a mirror to reflect the fundamental wave laser light or an absorptive filter, and there is the advantage that fluctuations in the second harmonic output can be reduced using a simple configuration.

By applying a coating which satisfactorily reflects light at the fundamental wave wavelength or affixing a mirror which reflects the fundamental wave to the end face of the element immobilizing base 67, absorption at the time of reflection can be further reduced, so that fluctuations in the second harmonic output can be reduced even upon fundamental wave irradiation at even higher power.

Further, by using a colored glass filter, beam diffuser or similar arranged such that thermal resistance with respect to the temperature control portion 68 is increased, to cause absorption or diffusion of fundamental wave laser light reflected from the end face of the element immobilizing base 67, the thermal effect on the wavelength conversion element 3 can be reduced. Further, by providing a colored glass filter, diffuser or similar as a heat-dissipating mechanism independent of the temperature control element 6, the effect on the temperature of the wavelength conversion element 3 can be eliminated, and stabilized output can be obtained.

Further, the end face of the element immobilizing base 67 on the side of the second concave mirror 5 may also be machined to an angle which is not perpendicular to the angle of incidence of the fundamental wave, to form a reflecting end face. At this time, if the thickness of the wavelength conversion element 3 is T, the diameter (length in the element thickness direction) of the second concave mirror 5 is $r_2$, and the distance between the second concave mirror 5 and the end face of the wavelength conversion element 3 on the side of the second concave mirror 5 is $d_2$, then it is desirable that the angle $\phi_2$ made by the optical axis of the fundamental wave incident on the reflecting end face of the element immobilizing base 67 on the side of the second concave mirror 5 with the reflecting end face of the element immobilizing base 67 on the side of the second concave mirror 5 satisfy $(r_2-T)/2 > d_2 \times \tan(\pi-2\phi_2)$.

In this case also, an advantageous result similar to that of the reflecting end face RP of the element immobilizing base 67 can be obtained. Further and similarly, by using a colored glass filter, beam diffuser or similar to cause absorption or diffusion of the fundamental wave laser light reflected by the end face of the element immobilizing base 67 on the side of the second concave mirror 5, the thermal effect on the wavelength conversion element 3 can be reduced, and a light source with still more stable output can be provided.

Further, in this embodiment a reflecting end face was formed on only an end face of the element immobilizing base 67, but configurations are not limited to this example in particular, and a reflecting end face may also be formed on an end face of the temperature control element 6, or a reflecting end face may be formed on only an end face of the temperature control element 6, and various other modifications are possible.

(Embodiment 3)

Figure 17:
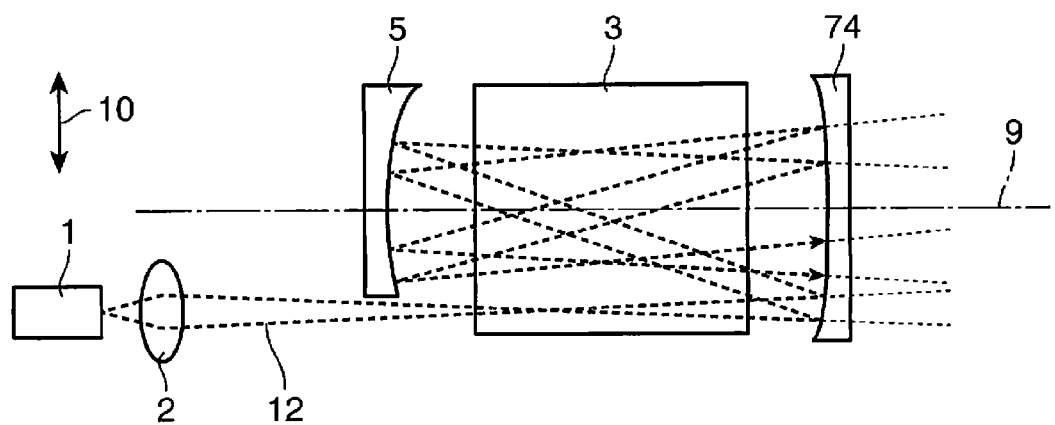
FIG. 17 is a top view of the wavelength conversion laser light source in Embodiment 3 of the invention.
Figure 18:
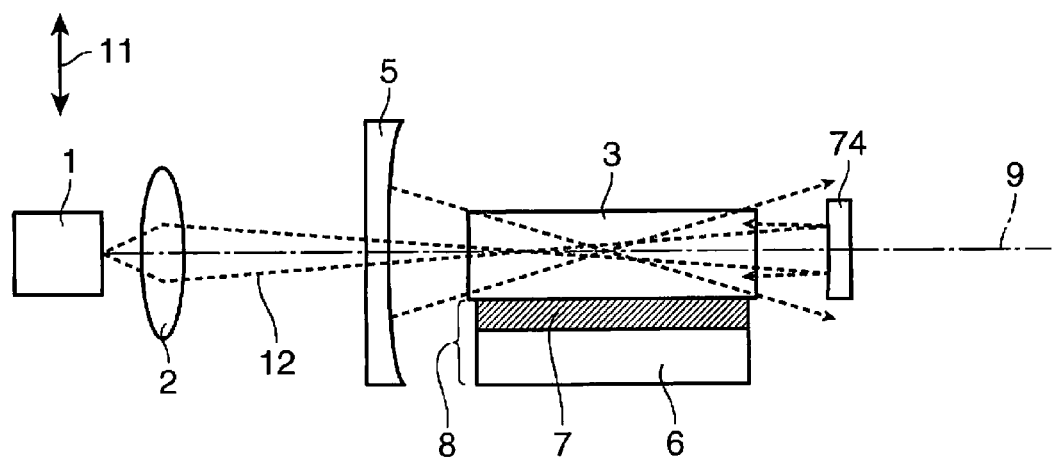
FIG. 18 is a side view of the wavelength conversion laser light source shown in FIG. 17.

FIG. 17 and FIG. 18 schematically show an example of the configuration of the wavelength conversion laser light source of Embodiment 3 of the invention; FIG. 17 is diagram seen from above of the wavelength conversion laser light source of this embodiment, and FIG. 18 is a diagram seen from the side of the wavelength conversion laser light source shown in FIG. 17. Below, the directions indicated by the arrow 10 in FIG. 17 and by the arrow 11 in FIG. 18 are respectively taken to be the element width direction and the element thickness direction.

In FIG. 17 and FIG. 18, reference numeral 1 denotes a fundamental wave laser light source to generate a fundamental wave, 2 denotes a condensing optical system to condense the fundamental wave, 3 denotes a wavelength conversion element to cause conversion of the fundamental wave into the second harmonic, 74 denotes a first concave mirror having curvature R1, 5 denotes a second concave mirror having curvature R2 different from curvature R1, 6 denotes a temperature control element to control the temperature of the wavelength conversion element 3, and 7 denotes an element immobilizing base to immobilize the wavelength conversion element 3; the temperature control element 6 and element immobilizing base 7 form a temperature control portion 8.

Further, 9 shown in FIG. 17 and FIG. 18 denotes a central axis, which is an axis passing through the centers of the first concave mirror 74, second concave mirror 5, and wavelength conversion element 3; the dashed lines denoted by 12 schematically indicate the paths of fundamental wave laser light and the condensed state in the optical system comprised by the wavelength conversion laser device of this embodiment.

A difference of the wavelength conversion laser light source of this embodiment from the wavelength conversion laser light source described in Embodiment 1 is the omission of the fundamental wave absorption portion 18, instead machining a desired portion of the first concave mirror 74 in the vertical direction (element thickness direction), for example by cutting away or similar, to make the first concave mirror 74 smaller than the thickness of the wavelength conversion element 3. As a result, the fundamental wave laser light quantity irradiating and absorbed by the element immobilizing base 7 is reduced, and a rise in the temperature of the wavelength conversion element 3 can be prevented, so that the wavelength conversion laser output can be stabilized.

Below, the operation and function of this embodiment which differ from those of Embodiment 1 are explained. As shown in FIG. 18, a desired portion of the first concave mirror 74 in the vertical direction (element thickness direction) is machined, by for example cutting away or similar, to make the vertical width of the first concave mirror 74 smaller than the thickness of the wavelength conversion element 3.

Specifically, in order to make the first concave mirror 74 of a size and shape such that all the reflected fundamental wave laser light is incident on the wavelength conversion element 3, the upper portion and lower portion of the circular first concave mirror 74 are cut away, such that the thickness of the reflecting area in the element thickness direction of the first concave mirror 74 is the same 0.5 mm as the thickness of the wavelength conversion element 3. By means of such a configuration, among the fundamental wave light arriving at the first concave mirror 74, the fundamental wave laser light existing in the area more than 0.25 mm in the vertical direction from the center of the first concave mirror 74 is not reflected, but is emitted to outside of the first concave mirror 74.

On the other hand, the beam diameter, on the surface of the first concave mirror 74, of the fundamental wave laser light reflected by the first concave mirror 74 is equal to or less than the thickness of the wavelength conversion element 3 (in this embodiment, 0.5 mm), so that the fundamental wave laser light reflected by the first concave mirror 74 always passes through the wavelength conversion element 3, and fundamental wave laser light is wavelength-converted into the second harmonic.

By means of this embodiment, irradiation of the element immobilizing base 7 and temperature control element 6 by fundamental wave laser light reflected by the first concave mirror 74 is eliminated (that is, fundamental wave laser light which cannot be incident on the wavelength conversion element 3 is not reflected by the first concave mirror 74), so that in principle there is no occurrence of temperature change arising from fundamental wave absorption by the temperature control portion 8, rises in the temperature of the wavelength conversion element 3 can be prevented, and fluctuations in the second harmonic output can be reduced.

By shape-machining the top and bottom (element thickness direction) of the second concave mirror 5 by cutting away or similar, to obtain a configuration in which fundamental wave laser light reflected by the second concave mirror 5 is all incident on the wavelength conversion element 3, a similar advantageous result can be obtained. Further, by machining the shapes and sizes in the element thickness direction of both the first concave mirror 74 and the second concave mirror 5 to desired shapes and sizes, there is the advantage that the thickness-direction size of the overall device comprising the wavelength conversion element 3 can be reduced.

Further, in this embodiment, an example was described in which the top portion and bottom portion in the element thickness direction of the first concave mirror 74 are cut away; but a member comprising a material which does not reflect the fundamental wave, such as for example an absorptive member which absorbs the fundamental wave or a transmissive member which transmits and emits the fundamental wave to the outside, may be comprised in the peripheral portion of the first concave mirror 74 corresponding to these cut-away portions, so that fundamental wave laser light irradiating the element immobilizing base 7 and temperature control element 6 can be eliminated, and fluctuations in the temperature of the wavelength conversion element 3 can be reduced. Further, a similar advantageous result can be obtained by applying a coating which is nonreflective for the fundamental wave to a desired portion of the first concave mirror 74 (for example, the surface areas equal to or greater than 0.25 mm above or below the center, in the element thickness direction, of the first concave mirror 74).

Further, the fundamental wave laser light which is emitted to the outside without being reflected by the first concave mirror 74 and/or the second concave mirror 5 can be processed by for example an absorptive member or beam diffuser affixed to metal with high thermal conductivity, to eliminate the effect on temperature fluctuation of the wavelength conversion element 3.

(Embodiment 4)

In this embodiment, a configuration is explained in which, instead of the second concave mirror 5 a cylindrical mirror 51 is used to limit expansion of the fundamental wave beam diameter, so that the fundamental wave laser light does not irradiate the element immobilizing base 7. By using this configuration, the advantageous result of reducing fluctuation in the second harmonic output arising from temperature fluctuation of the wavelength conversion element 3, similar to that of the above-described Embodiments 1 to 3, is obtained.

Figure 19:
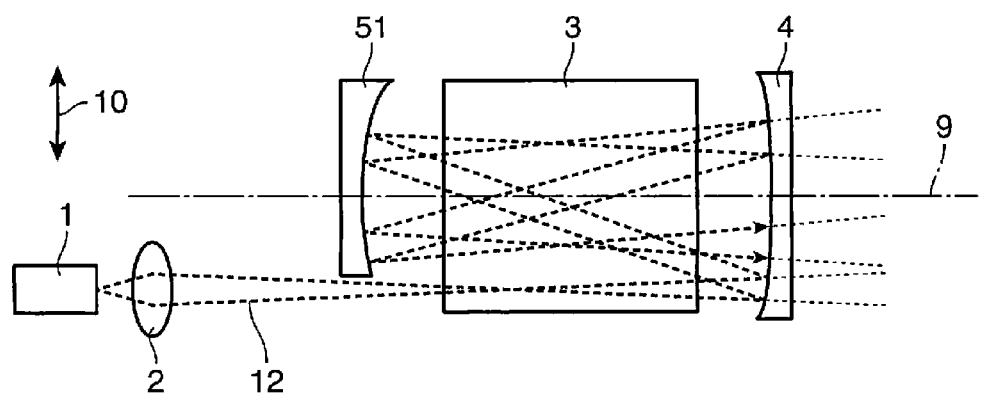
FIG. 19 is a top view of the wavelength conversion laser light source in Embodiment 4 of the invention.
Figure 20:
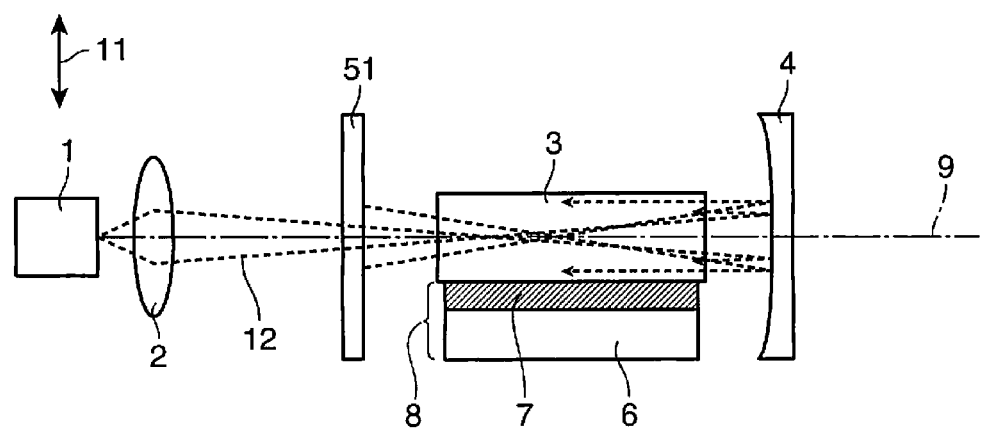
FIG. 20 is a side view of the wavelength conversion laser light source shown in FIG. 19.

FIG. 19 and FIG. 20 schematically show an example of the configuration of the wavelength conversion laser light source of Embodiment 4 of the invention; FIG. 19 is diagram seen from above of the wavelength conversion laser light source of this embodiment, and FIG. 20 is a diagram seen from the side of the wavelength conversion laser light source shown in FIG. 19. Below, the directions indicated by the arrow 10 in FIG. 19 and by the arrow 11 in FIG. 20 are respectively taken to be the element width direction and the element thickness direction.

In FIG. 19 and FIG. 20, reference numeral 1 denotes a fundamental wave laser light source to generate a fundamental wave, 2 denotes a condensing optical system to condense the fundamental wave, 3 denotes a wavelength conversion element to cause conversion of the fundamental wave into the second harmonic, 4 denotes a first concave mirror having curvature R1, 51 denotes a second mirror comprising a cylindrical mirror having, in only one direction (the element width direction), curvature R2 different from curvature R1, 6 denotes a temperature control element to control the temperature of the wavelength conversion element 3, and 7 denotes an element immobilizing base to immobilize the wavelength conversion element 3; the temperature control element 6 and element immobilizing base 7 form a temperature control portion 8.

Further, 9 shown in FIG. 19 and FIG. 20 denotes a central axis, which is the axis passing through the centers of the first concave mirror 4, second mirror 51, and wavelength conversion element 3, and the dashed lines denoted by 12 schematically indicate the paths of fundamental wave laser light and the condensed state in the optical system comprised by the wavelength conversion laser device of this embodiment.

A difference of the wavelength conversion laser light source of this embodiment from the wavelength conversion laser light source described in Embodiment 1 is the omission of the fundamental wave absorption portion 18, using a second mirror 51 instead of the second concave mirror 5, and suppressing expansion in the vertical direction (element thickness direction) of the fundamental wave beam diameter. As a result, the fundamental wave light quantity irradiating and absorbed by the element immobilizing base 7 is reduced, and a rise in the temperature of the wavelength conversion element 3 can be prevented, so that the wavelength conversion laser output can be stabilized.

Here, as the first concave mirror 4 a concave mirror with focal length f1=22 mm, and as the second mirror 51 a cylindrical mirror with focal length f2=20 mm, are used. As the wavelength conversion element 3, MgO:LiNbO$_3$ crystal having a periodically poled structure (length 26 mm, width 10 mm, thickness 0.5 mm) is used.

Below, the operation and function of this embodiment which differ from those of Embodiment 1 are explained. By using the above configuration, optically condensed positions of the fundamental wave which has been reflected by the first concave mirror 4 and the second mirror 51 and is repeatedly incident on the wavelength conversion element 3 are shifted in the element width direction and element thickness direction, and the beam shape becomes elliptical.

At this time, similarly to Embodiment 1, in the element width direction, light reflected by the first concave mirror 4 is substantially parallel, and light reflected by the second mirror 51 is condensed within the element, so that the relation between the fundamental wave laser light beam diameter in the element width direction and the path number is as shown in FIG. 5.

Figure 21:
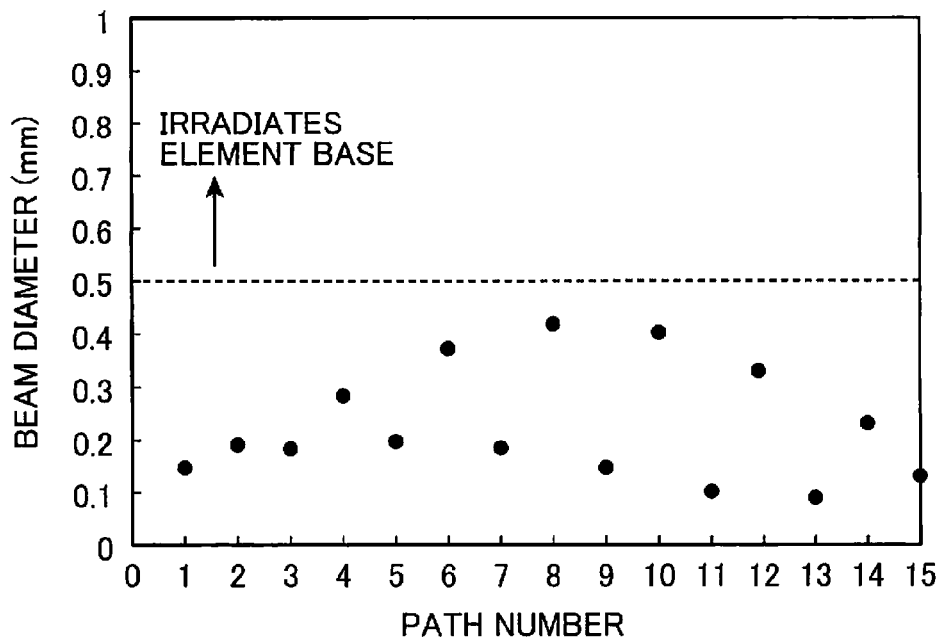
FIG. 21 shows changes in the beam diameter of the fundamental wave in the element thickness direction upon incidence on the wavelength conversion element in Embodiment 4 of the invention.

On the other hand, the fundamental wave beam diameter in the element thickness direction is as shown in FIG. 21. FIG. 21 shows the fundamental wave beam diameter in the element thickness direction at the incident end face (for example, positions shown in FIG. 4) of the wavelength conversion element 3 on each path. In FIG. 21, the horizontal axis indicates the path number, and the vertical axis indicates the fundamental wave beam diameter (mm).

As shown in FIG. 21, in the second mirror 51, fundamental wave reflection in the element thickness direction is reflection by a planar mirror, so that the beam reflected by the second mirror 51 and incident on the wavelength conversion element 3 is a converging beam, and in the element thickness direction at the end face of the wavelength conversion element 3 the fundamental wave beam diameter is always 0.5 mm or less.

Hence the fundamental wave beam diameter does not become larger than the thickness of the wavelength conversion element 3, and the fundamental wave is always incident on the wavelength conversion element 3, so that the temperature control element 6 and element immobilizing base 7 are never irradiated, and absorption of fundamental wave laser light by the temperature control element 6 and element immobilizing base 7 and heat generation can be prevented.

By this means, in this embodiment a rise in the temperature of the wavelength conversion element 3 could be prevented, and the second harmonic output fluctuation could be suppressed to within 3%. Further, using this configuration, element width-direction optically condensed positions and element thickness-direction optically condensed positions are shifted, and so the optical density of fundamental wave laser light within the wavelength conversion element 3 can be lowered, and absorption of the fundamental wave and second harmonic by the wavelength conversion element 3 can be reduced. Further, by means of this configuration, there is no need for positioning of the second mirror 51 in the element thickness direction, and the assembly and adjustment process can be simplified.

(Embodiment 5)

Figure 22:
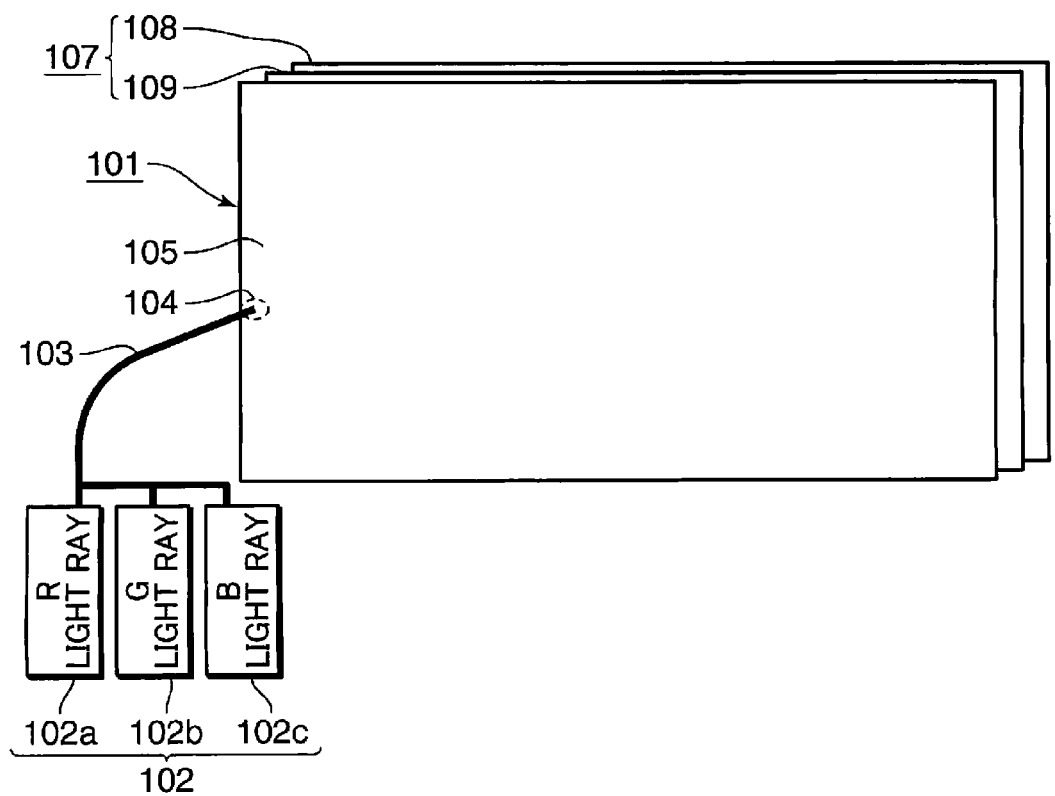
FIG. 22 is a summary configuration diagram showing an example of the configuration of the liquid crystal display device in Embodiment 5 of the invention.

FIG. 22 is a summary diagram showing, as an example of an image display device, the configuration of a liquid crystal display using a backlight illumination device including any one of the wavelength conversion laser light sources in the above Embodiments 1 to 4.

In FIG. 22, reference numeral 101 denotes a backlight illumination device, 102 denotes a laser light source, 103 denotes an optical fiber, 104 denotes a light guide portion, 105 denotes a light guide plate, 107 denotes a liquid crystal display panel which is a spatial modulation element, 108 denotes a polarization plate, and 109 denotes a liquid crystal plate. Here, the laser light source 102 included in the backlight illumination device 101 comprises a red laser light source 102a (hereafter R light source), a green laser light source 102b (hereafter G light source), and a blue laser light source 102c (hereafter B light source).

In this laser light source 102, the G light source 102b is a wavelength conversion laser light source according to any one of Embodiments 1 to 4 of the invention. Further, as the R light source 102a a semiconductor laser of wavelength 640 nm comprising an AlGaInP/GaAs system material is used, and as the B light source 102c a semiconductor laser of wavelength 450 nm comprising GaN system material is used.

The backlight illumination device 101 comprises a laser light source 102, optical fiber 103 which bundles red laser light, green laser light and blue laser light from the laser light source 102 and guides the light to the light guide plate 105 via the light guide portion 104, and light guide plate 105 which uniformly emits the guided red laser light, green laser light, and blue laser light from a principal face (not shown).

The G light source 102b adds a condensing lens (not shown) or other optical component to the wavelength conversion laser light source described in any of Embodiments 1 to 4, and the output light thereof is efficiently coupled to the optical fiber 103 and is guided to the light guide plate 105. By means of this configuration, an image display device can be realized with excellent color reproducibility and low power consumption. Further, in order to increase the screen size of the image display device a laser light source with high and stable output is necessary, and by using the wavelength conversion laser light source described in any of Embodiments 1 to 4, the screen size of the image display device can be increased.

Further, as an image display device using a laser light source, here a liquid crystal display device using a transmissive liquid crystal panel as a spatial optical modulation element was employed as an example; but similar advantageous results can be realized even in projectors or other image display devices using DMDs (Digital Micro-mirror Devices), reflective liquid crystal (LCOS: Liquid Crystal On Silicon), or other spatial modulation elements.

Further, the optical system which guides light output from a laser light source to a spatial modulation element employs an optical fiber, light guide portion, and light guide plate, but a dichroic mirror, cross prism, rod integrator, or similar may also be used.

The above-described Embodiments 1 to 5 are examples, and of course various modes can be adopted without deviating from the gist of the invention.

The invention is summarized in light of the above embodiments as follows. That is, a wavelength conversion laser light source of this invention comprises a fundamental wave laser light source to generate a fundamental wave; a first mirror and a second mirror, arranged so as to be mutually opposed; a wavelength conversion element which is arranged between the first mirror and the second mirror and converts the wavelength of the fundamental wave; and a temperature control portion to control the temperature of the wavelength conversion element. A portion of the fundamental wave is wavelength-converted in the wavelength conversion element, and the fundamental wave which is not wavelength-converted is reflected by the first mirror and the second mirror and is repeatedly incident on the wavelength conversion element and wavelength-converted; and the temperature control portion is arranged so as to be in contact with the wavelength conversion element, and the fundamental wave light quantity incident on the temperature control portion is reduced.

In this wavelength conversion laser light source, a portion of the fundamental wave is wavelength-converted by the wavelength conversion element, and moreover the fundamental wave which is not wavelength-converted is reflected by the first mirror and the second mirror and is repeatedly incident on the wavelength conversion element, and by this means the fundamental wave is repeatedly wavelength-converted within the wavelength conversion element while the angle of incidence changes, so that the temperature tolerance width of the wavelength conversion element can be expanded in a state in which high wavelength conversion efficiency is maintained. Further, the temperature control portion is arranged so as to be in contact with the wavelength conversion element, and the fundamental wave light quantity incident on the temperature control portion is reduced, so that absorption by the temperature control portion of the fundamental wave not incident on the wavelength conversion element can be prevented, and fluctuations in the output of the wavelength conversion laser light source can be reduced. As a result, fluctuations in the wavelength conversion efficiency of the wavelength conversion element due to the unwanted fundamental wave can be suppressed, and a wavelength conversion laser light source with high efficiency of wavelength conversion from the fundamental wave to the second harmonic, and with high output and high stability, can be realized.

It is preferable that the first mirror include a first concave mirror having a first curvature, that the second mirror include a second concave mirror having a second curvature different from the first curvature, and that the wavelength conversion laser light source further comprise a condensing optical system arranged such that there are points at which the fundamental wave is optically condensed within the wavelength conversion element, and a fundamental wave blocking portion which is arranged between the first concave mirror and the temperature control portion and/or between the second concave mirror and the temperature control portion, and which reduces the fundamental wave light quantity absorbed by the temperature control portion.

In this case, by arranging the wavelength conversion element between two concave mirrors with different curvatures, the fundamental wave is repeatedly incident on the wavelength conversion element while the incidence angle changes and is converted into the second harmonic. Further, by means of the fundamental wave blocking portion, absorption by the temperature control portion of the fundamental wave not incident on the wavelength conversion element can be prevented, so that fluctuations in the output of the wavelength conversion laser light source can be reduced.

It is preferable that the fundamental wave blocking portion include a fundamental wave absorption portion which absorbs the fundamental wave so that the fundamental wave is not incident on the temperature control portion, and that the fundamental wave absorption portion be thermally separated from the temperature control portion.

In this case, the fundamental wave absorption portion absorbs the fundamental wave which is not incident on the wavelength conversion element, and absorption by the temperature control portion of the fundamental wave not incident on the wavelength conversion element can be prevented, so that fluctuation in the wavelength conversion laser light source output can be reduced. Further, the fundamental wave absorption portion and the temperature control portion are thermally separated, so that rises in temperature due to fundamental wave absorption by the fundamental wave absorption portion can be reduced, changes in the temperature of the wavelength conversion element due to heat generated from the fundamental wave absorption portion can be prevented, and a wavelength conversion laser light source with more stable output can be provided.

It is preferable that the fundamental wave blocking portion include a reflecting mirror which reflects the fundamental wave so that the fundamental wave is not incident on the temperature control portion.

In this case, the fundamental wave is reflected so that the fundamental wave is not incident on the temperature control portion, and so the fundamental wave which could not be incident on the wavelength conversion element can be prevented from incidence on the temperature control portion, and moreover no fundamental wave absorption occurs at the reflecting mirror and no heat is generated, so that a heat-dissipating mechanism can be omitted, and the cost of a heat-dissipating mechanism can be eliminated.

If the thickness of the wavelength conversion element is T, the length of the first concave mirror in the thickness direction of the wavelength conversion element is $r_1$, the length of the second concave mirror in the thickness direction of the wavelength conversion element is $r_2$, the distance between the first concave mirror and an end face of the wavelength conversion element on the side of the first concave mirror is $d_1$, and the distance between the second concave mirror and an end face of the wavelength conversion element on the side of the second concave mirror is $d_2$, then when the reflecting mirror is arranged between the first concave mirror and the temperature control portion, it is preferable that the angle $\theta_1$ made by an optical axis of the fundamental wave incident on the reflecting mirror and a reflecting face of the reflecting mirror satisfy $(r_1-T)/2 > d_1 \times \tan(\pi-2\theta_1)$, and when the reflecting mirror is arranged between the second concave mirror and the temperature control portion, it is preferable that the angle $\theta_2$ made by the optical axis of the fundamental wave incident on the reflecting mirror and the reflecting face of the reflecting mirror satisfy $(r_2-T)/2 > d_2 \times \tan(\pi-2\theta_2)$.

In this case, the fundamental wave reflected by the reflecting mirror can be reflected outside the first concave mirror and the second concave mirror, without being again reflected by the first concave mirror or second concave mirror.

It is preferable that the temperature control portion have a reflecting end face which reflects the fundamental wave so that the fundamental wave is not incident on the temperature control portion.

In this case, the fundamental wave can be reflected so that the fundamental wave is not incident on the temperature control portion, so that incidence on the temperature control portion of the fundamental wave which could not be incident on the wavelength conversion element can be prevented, and an end face of the temperature control portion cam be used as a reflecting face, so that the number of components can be reduced and the cost of the device can be lowered.

If the thickness of the wavelength conversion element is T, the length of the first concave mirror in the thickness direction of the wavelength conversion element is $r_1$, the length of the second concave mirror in the thickness direction of the wavelength conversion element is $r_2$, the distance between the first concave mirror and an end face of the wavelength conversion element on the side of the first concave mirror is $d_1$, and the distance between the second concave mirror and an end face of the wavelength conversion element on the side of the second concave mirror is $d_2$, then when the reflecting end face is provided on the side of the first concave mirror, it is preferable that the angle $\phi_1$ made by an optical axis of the fundamental wave incident on the reflecting end face and the reflecting end face satisfy $(r_1-T)/2 > d_1 \times \tan(\pi-2\phi_1)$, and when the reflecting end face is provided on the side of the second concave mirror, it is preferable that the angle $\phi_2$ made by the optical axis of the fundamental wave incident on the reflecting end face and the reflecting end face satisfy $(r_2-T)/2 > d_2 \times \tan(\pi-2\phi_2)$.

In this case, the fundamental wave reflected by the reflecting end face can be reflected outside the first concave mirror and second concave mirror, without being again reflected by the first concave mirror or second concave mirror.

It is preferable that the first mirror include a first concave mirror having a first curvature, that the second mirror include a second concave mirror having a second curvature different from the first curvature, and that if the thickness-direction center of the wavelength conversion element is 0 and the thickness of the wavelength conversion element is T in the thickness direction of the wavelength conversion element, at least one of the first and second concave mirrors reflect the fundamental wave only in an area from $-T/2$ to $T/2$.

In this case, the fundamental wave reflected by at least one of the first and second concave mirrors is not incident on the temperature control portion, and always passes through the wavelength conversion element and is wavelength-converted from the fundamental wave to the second harmonic, so that the fundamental wave light quantity absorbed by the temperature control portion can be reduced. As a result, a rise in temperature of the wavelength conversion element can be prevented, and fluctuations in the output of the wavelength conversion laser light source can be reduced.

It is preferable that one of the first and second mirrors include a concave mirror having a first curvature, and that the other include a cylindrical mirror having, in the width direction of the wavelength conversion element, a second curvature different from the first curvature, and that the cylindrical mirror limit a diameter of the fundamental wave in the thickness direction of the wavelength conversion element to be equal to or less than the thickness of the wavelength conversion element.

In this case, expansion of the fundamental wave beam in the thickness direction of the wavelength conversion element can be suppressed, so that the fundamental wave beam does not become greater than the thickness of the wavelength conversion element, and the fundamental wave is always incident on the wavelength conversion element, so that the fundamental wave light quantity absorbed by the temperature control portion can be reduced. As a result, rises in the temperature of the wavelength conversion element can be prevented, and fluctuations in the output of the wavelength conversion laser light source can be reduced.

It is preferable that at least one of the first and second mirrors have a cutout area to cause the fundamental wave generated from the fundamental wave laser light source to be incident on the wavelength conversion element.

In this case, the fundamental wave from the cutout area can easily be made incident on the wavelength conversion element.

An image display device of this invention comprises a laser light source which generates laser light of at least one color among blue, green, and red; a spatial optical modulation element; and an optical system which guides light emitted from the laser light source to the spatial optical modulation element. The laser light source is any one of the wavelength conversion laser light sources described above.

In this image display device, a stable, high-output wavelength conversion laser light source can be used as a laser light source, so that the screen size of the image display device can be increased, and a large-size image display device with excellent color reproducibility and low power consumption can be realized.

INDUSTRIAL APPLICABILITY

A wavelength conversion laser light source of this invention is useful as a highly efficient wavelength conversion laser light source having excellent temperature controllability and output stability.

The invention claimed is:

1. A wavelength conversion laser light source, comprising:
a fundamental wave laser light source to generate a fundamental wave;
a first mirror and a second mirror, arranged so as to oppose each other;
a wavelength conversion element which is arranged between the first mirror and the second mirror and converts the wavelength of the fundamental wave; and
a temperature control portion to control the temperature of the wavelength conversion element,
wherein a portion of the fundamental wave is wavelength-converted in the wavelength conversion element, and moreover the fundamental wave which is not wavelength-converted is reflected by the first mirror and the second mirror and is repeatedly incident on the wavelength conversion element and is wavelength-converted, and
the temperature control portion is arranged so as to be in contact with the wavelength conversion element, and the light quantity of the fundamental wave incident on the temperature control portion is reduced.

2. The wavelength conversion laser light source according to claim 1, wherein the first mirror includes a first concave mirror having a first curvature,
the second mirror includes a second concave mirror having a second curvature different from the first curvature, and
the wavelength conversion laser light source further comprises
a condensing optical system arranged such that the fundamental wave has an optically condensed point within the wavelength conversion element, and
a fundamental wave blocking portion which is arranged between the first concave mirror and the temperature control portion and/or between the second concave mirror and the temperature control portion, and which reduces the light quantity of the fundamental wave absorbed by the temperature control portion.

3. The wavelength conversion laser light source according to claim 2, wherein the fundamental wave blocking portion includes a fundamental wave absorption portion which absorbs the fundamental wave such that the fundamental wave is not incident on the temperature control portion, and the fundamental wave absorption portion is thermally separated from the temperature control portion.

4. The wavelength conversion laser light source according to claim 2, wherein the fundamental wave blocking portion includes a reflecting mirror which reflects the fundamental wave such that the fundamental wave is not incident on the temperature control portion.

5. The wavelength conversion laser light source according to claim 4, wherein, if the thickness of the wavelength conversion element is T, the length of the first concave mirror in the thickness direction of the wavelength conversion element is $r_1$, the length of the second concave mirror in the thickness direction of the wavelength conversion element is $r_2$, the distance between the first concave mirror and an end face of the wavelength conversion element on the side of the first concave mirror is $d_1$, and the distance between the second concave mirror and an end face of the wavelength conversion element on the side of the second concave mirror is $d_2$, then when the reflecting mirror is arranged between the first concave mirror and the temperature control portion, the angle $\theta_1$ made by an optical axis of the fundamental wave incident on the reflecting mirror and a reflecting face of the reflecting mirror satisfies $(r_1-T)/2 > d_1 \times \tan(\pi-2\theta_1)$, and when the reflecting mirror is arranged between the second concave mirror and the temperature control portion, the angle $\theta_2$ made by the optical axis of the fundamental wave incident on the reflecting mirror and the reflecting face of the reflecting mirror satisfies $(r_2-T)/2 > d_2 \times \tan(\pi-2\theta_2)$.

6. The wavelength conversion laser light source according to claim 2, wherein the temperature control portion has a reflecting end face which reflects the fundamental wave such that the fundamental wave is not incident on the temperature control portion.

7. The wavelength conversion laser light source according to claim 6, wherein, if the thickness of the wavelength conversion element is T, the length of the first concave mirror in the thickness direction of the wavelength conversion element is $r_1$, the length of the second concave mirror in the thickness direction of the wavelength conversion element is $r_2$, the distance between the first concave mirror and an end face of the wavelength conversion element on the side of the first concave mirror is $d_1$, and the distance between the second concave mirror and an end face of the wavelength conversion element on the side of the second concave mirror is $d_2$, then when the reflecting end face is provided on the side of the first concave mirror, the angle $\phi_1$ made by an optical axis of the fundamental wave incident on the reflecting end face and the reflecting end face satisfies $(r_1-T)/2 > d_1 \times \tan(\pi-2\phi_1)$, and when the reflecting end face is provided on the side of the second concave mirror, the angle $\phi_2$ made by the optical axis of the fundamental wave incident on the reflecting end face and the reflecting end face satisfies $(r_2-T)/2 > d_2 \times \tan(\pi-2\phi_2)$.

8. The wavelength conversion laser light source according to claim 1, wherein the first mirror includes a first concave mirror having a first curvature, the second mirror includes a second concave mirror having a second curvature different from the first curvature, and if the thickness-direction center of the wavelength conversion element is 0 and the thickness of the wavelength conversion element is T in the thickness direction of the wavelength conversion element, at least one of the first and second concave mirrors reflects the fundamental wave only in an area from $-T/2$ to $T/2$.

9. The wavelength conversion laser light source according to claim 1, wherein one of the first and second mirrors includes a concave mirror having a first curvature, and the other includes a cylindrical mirror having, in the width direction of the wavelength conversion element, a second curvature different from the first curvature, and the cylindrical mirror limits a diameter of the fundamental wave in the thickness direction of the wavelength conversion element to be equal to or less than the thickness of the wavelength conversion element.

10. The wavelength conversion laser light source according to claim 1, wherein at least one of the first and second mirrors has a cutout area to cause the fundamental wave generated from the fundamental wave laser light source to be incident on the wavelength conversion element.

11. An image display device, comprising:

a laser light source, which generates laser light of at least one color among blue, green, and red;

a spatial optical modulation element; and an optical system which guides light emitted from the laser light source to the spatial optical modulation element;

wherein the laser light source is the wavelength conversion laser light source according to claim 1.

* * * * *